United States Patent [19]

Dixon et al.

[11] Patent Number: 4,490,782
[45] Date of Patent: Dec. 25, 1984

[54] I/O STORAGE CONTROLLER CACHE SYSTEM WITH PREFETCH DETERMINED BY REQUESTED RECORD'S POSITION WITHIN DATA BLOCK

[75] Inventors: Jerry D. Dixon; Gerald A. Marazas, both of Boca Raton; Gerald U. Merckel, Delray Beach, all of Fla.

[73] Assignee: International Business Machines Corporation, Armonk, N.Y.

[21] Appl. No.: 270,951

[22] Filed: Jun. 5, 1981

[51] Int. Cl.³ .................. G06F 9/06; G06F 13/00
[52] U.S. Cl. ........................................ 364/200
[58] Field of Search ... 364/200 MS File, 900 MS File

[56] References Cited

U.S. PATENT DOCUMENTS

| | | | |
|---|---|---|---|
| 3,588,829 | 6/1971 | Boland et al. | 364/200 |
| 3,588,839 | 6/1971 | Belady et al. | 364/200 |
| 3,670,307 | 6/1972 | Arnold et al. | 364/200 |
| 3,898,624 | 8/1975 | Tobias | 364/200 |
| 4,084,229 | 4/1978 | Taylor et al. | 364/200 |
| 4,086,629 | 4/1978 | Desyllas et al. | 364/200 |
| 4,189,770 | 2/1980 | Gannon et al. | 364/200 |
| 4,214,303 | 7/1980 | Joyce et al. | 364/200 |
| 4,215,402 | 7/1980 | Mitchell et al. | 364/200 |
| 4,219,883 | 8/1980 | Kobayashi et al. | 365/189 |
| 4,246,637 | 1/1981 | Brown et al. | 364/200 |
| 4,315,312 | 2/1982 | Schmidt et al. | 364/200 |
| 4,399,503 | 8/1983 | Hawley | 364/200 |
| 4,425,615 | 1/1984 | Swenson et al. | 364/200 |
| 4,426,682 | 1/1984 | Riffe et al. | 364/200 |
| 4,429,363 | 1/1984 | Duke et al. | 364/200 |

FOREIGN PATENT DOCUMENTS 2052118 1/1981 United Kingdom .

OTHER PUBLICATIONS

IBM Technical Disclosure Bulletin, vol. 21, No. 6, Nov. 1978, pp. 2468-2469, *Data Processing System with Second Level Cache*, F. J. Sparacio.
Electronic Design, Oct. 25, 1980, pp. 38-40, *Cache Memory Makes a Hit by Processing I/O Data Quickly*, T. Williams.

*Primary Examiner*—James D. Thomas
*Assistant Examiner*—A. E. Williams, Jr.
*Attorney, Agent, or Firm*—Sughrue, Mion, Zinn, Macpeak and Seas

[57] ABSTRACT

In a data processing system of the type wherein a host processor transfers data to or from a plurality of attachment devices, a cache memory is provided for storing blocks of data which are most likely to be needed by the host processor in the near future. The host processor can then merely retrieve the necessary information from the cache memory without the necessity of accessing the attachment devices. When transferring data to cache from an attachment disk, additional unrequested information can be transferred at the same time if it is likely that this additional data will soon be requested. Further, a directory table is maintained wherein all data in cache is listed at a "home" position and, if more than one block of data in cache have the same home position, a conflict chain is set-up so that checking the contents of the cache can be done simply and quickly.

22 Claims, 31 Drawing Figures

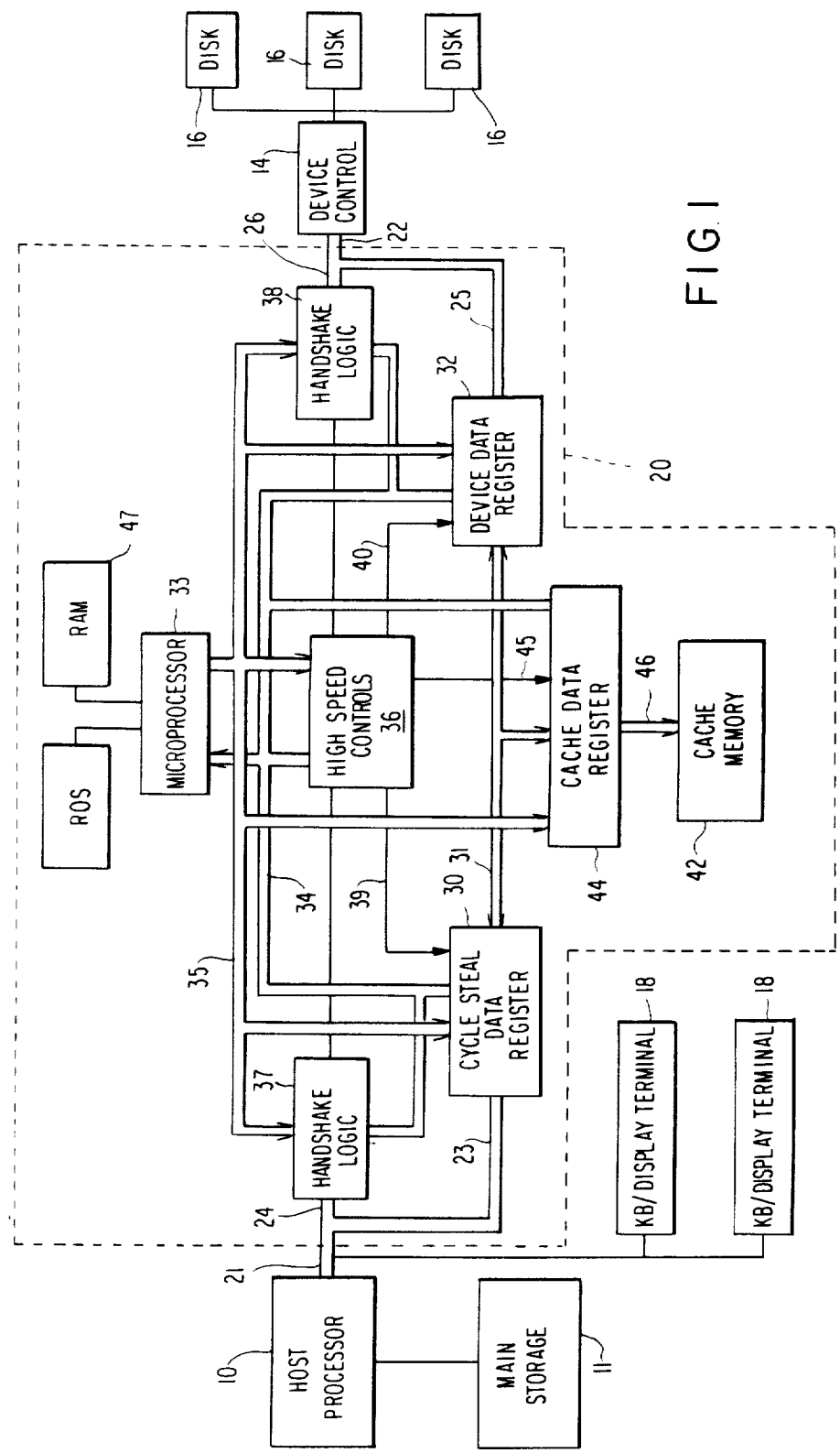

DIRECTORY TABLE

| | 1 BIT | 1 BIT | 11 BITS | 9 BITS | 9 BITS | 8 BITS |
|---|---|---|---|---|---|---|
| | FREE/USED INDICATOR | HOME INDICATOR | FILE SUBSYSTEM BLOCK ADDRESS | BACKWARD POINTER | FOWARD POINTER | CACHE ADDRESS |
| 0 | | | | | | |
| 1 | | | | | | |
| 2 | | | | | | |
| 3 | | | | | | |
| 4 | | | | | | |
| 5 | | | | | | |
| 6 | | | | | | |
| ⋮ | ⋮ | ⋮ | ⋮ | ⋮ | ⋮ | ⋮ |
| 309 | | | | | | |
| 310 | | | | | | |

52 — FIRST FREE POINTER

FREE PAGE COUNTER — 54

LEAST RECENTLY USED TABLE

| | FOWARD POINTER | BACKWARD POINTER | DIRECTORY POINTER |
|---|---|---|---|
| 0 | | | |
| 1 | | | |
| 2 | | | |
| 3 | | | |
| 4 | | | |
| ⋮ | ⋮ | ⋮ | ⋮ |
| 191 | | | |

50 — LEAST RECENTLY USED POINTER
MOST RECENTLY USED POINTER — 51

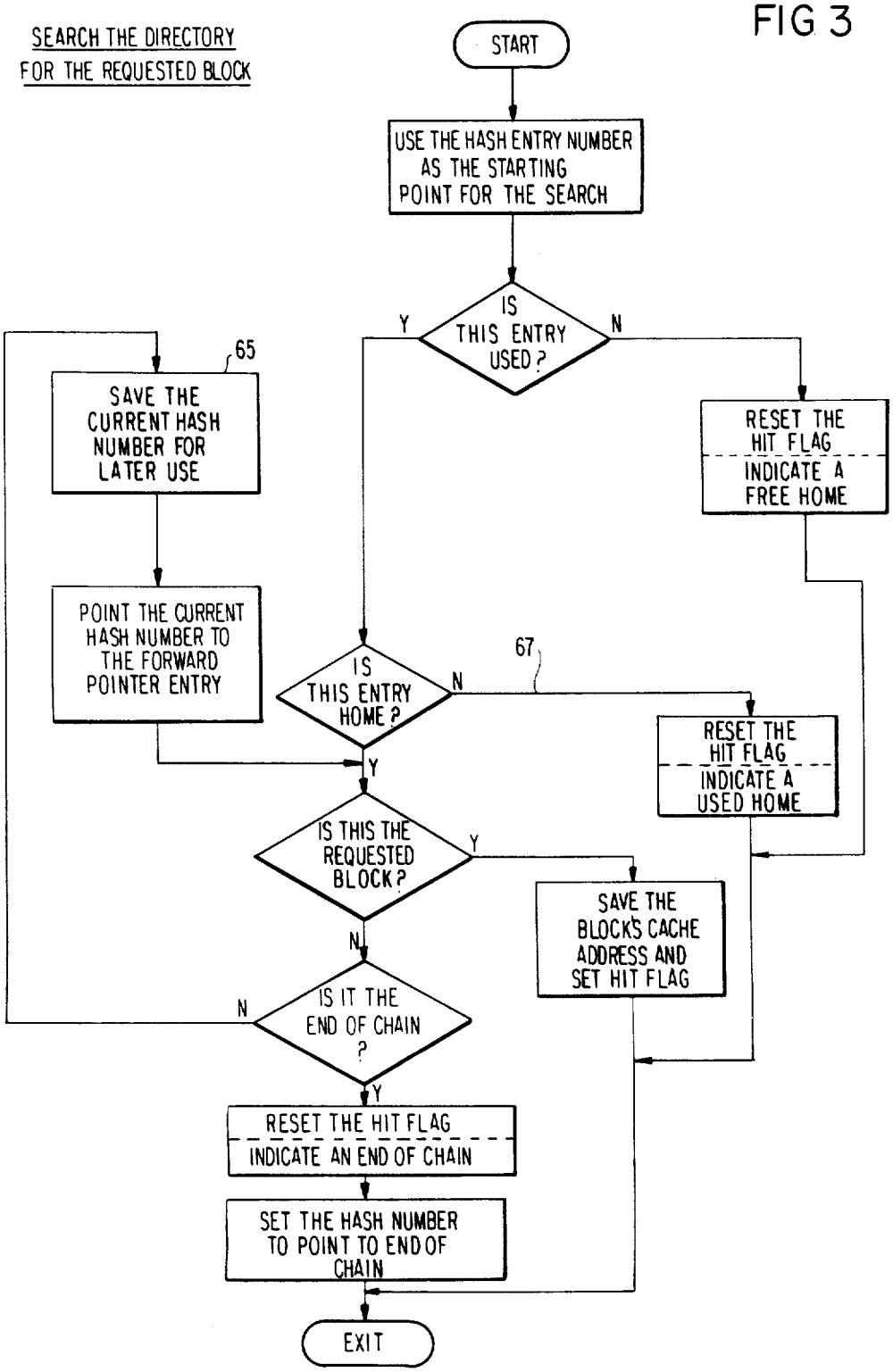

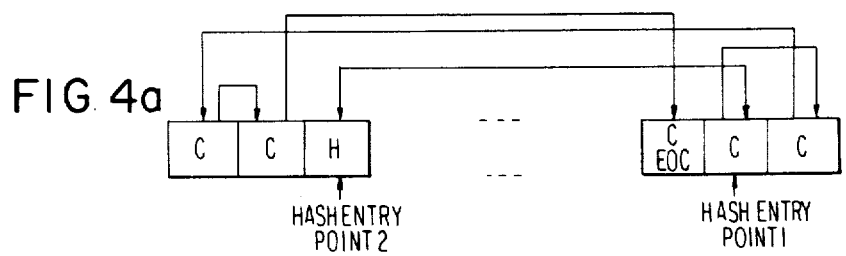
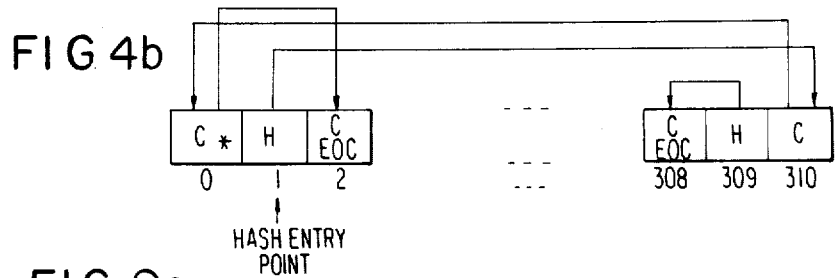
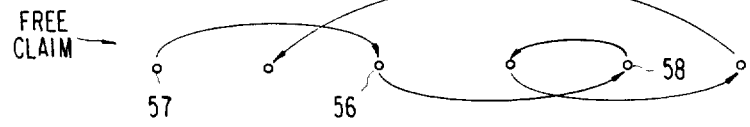
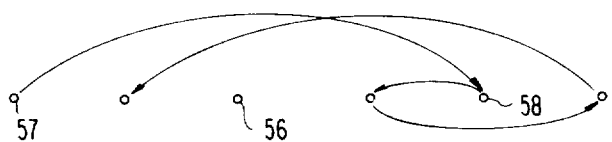
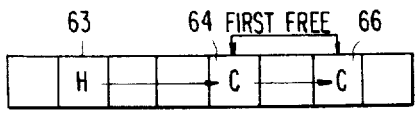
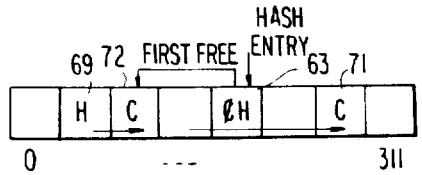

FIG. 6c
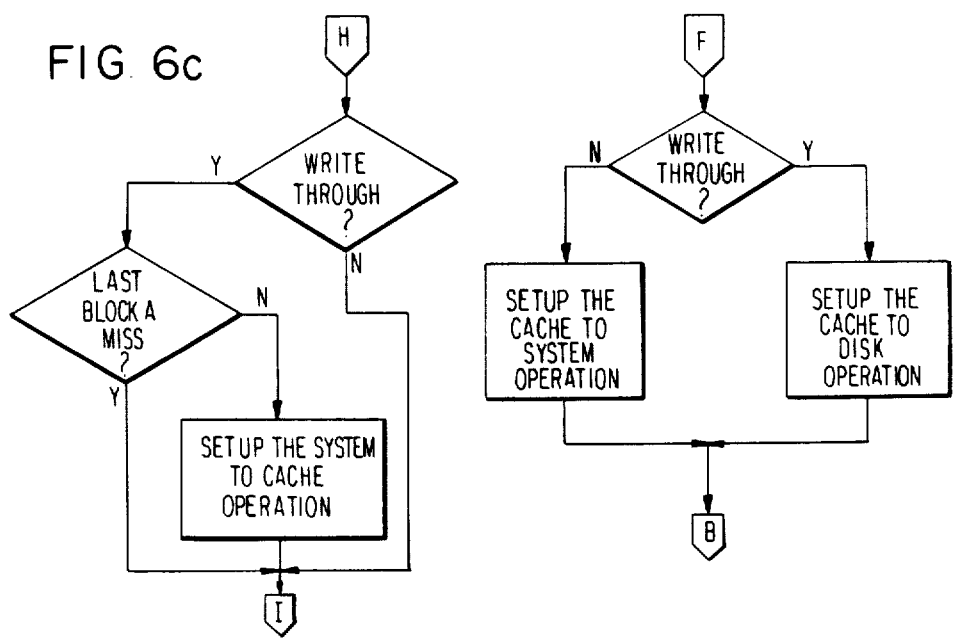
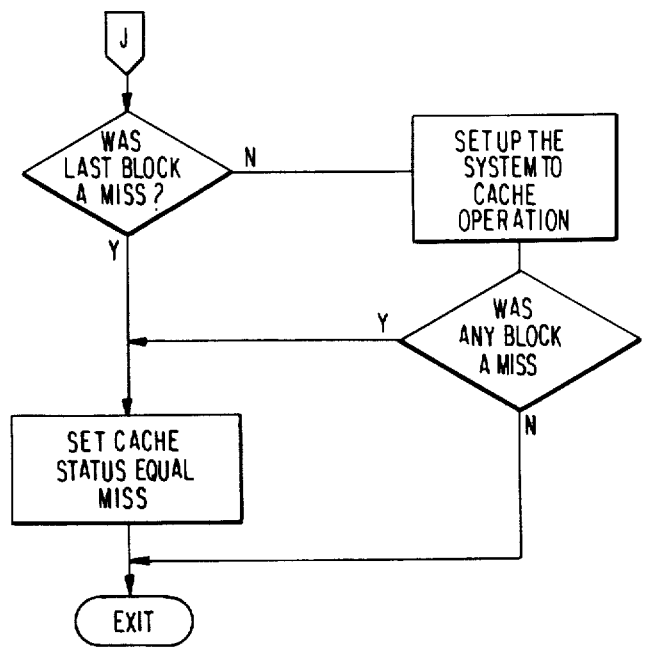

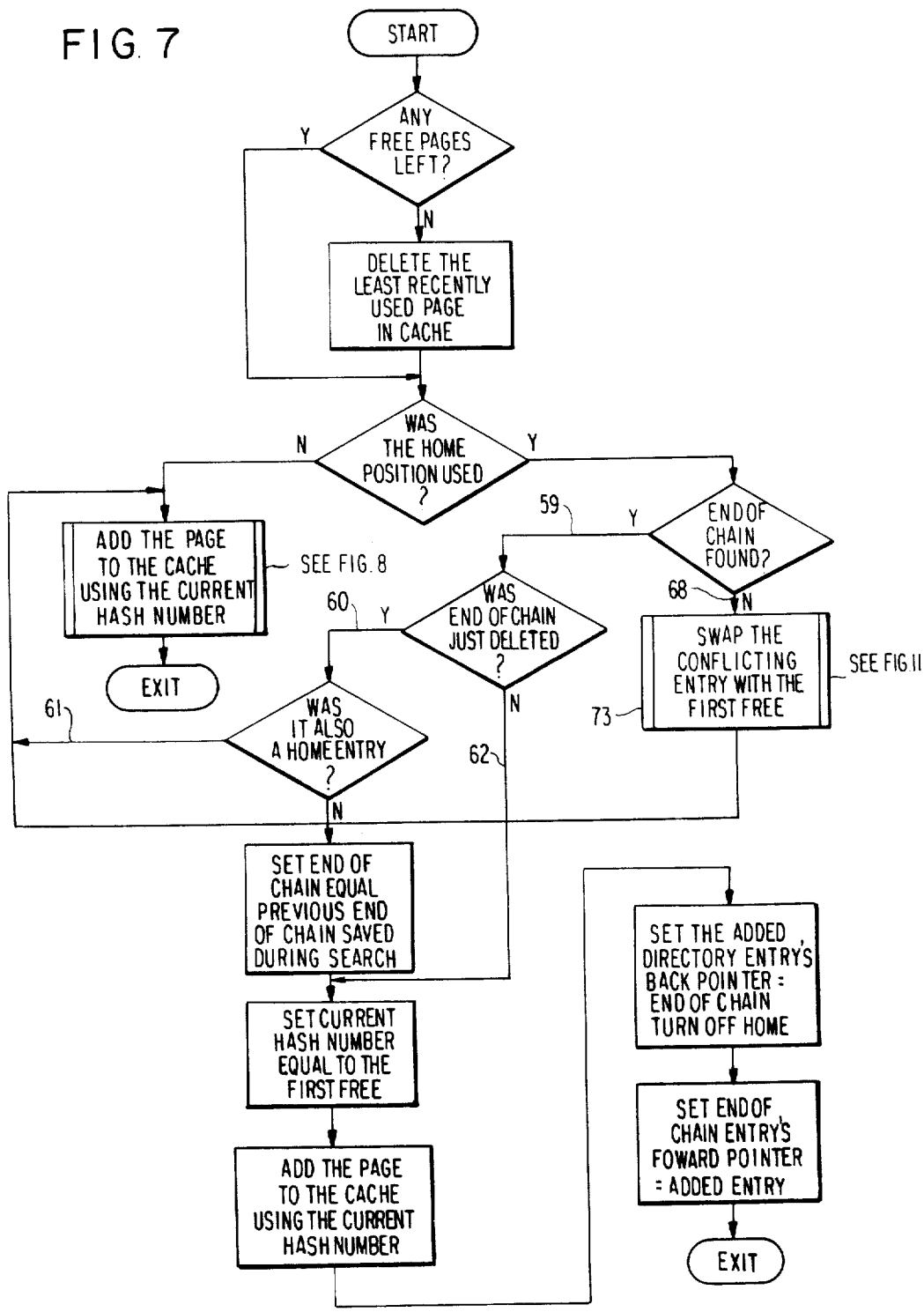
FIG. 7 ADD A BLOCK TO CACHE

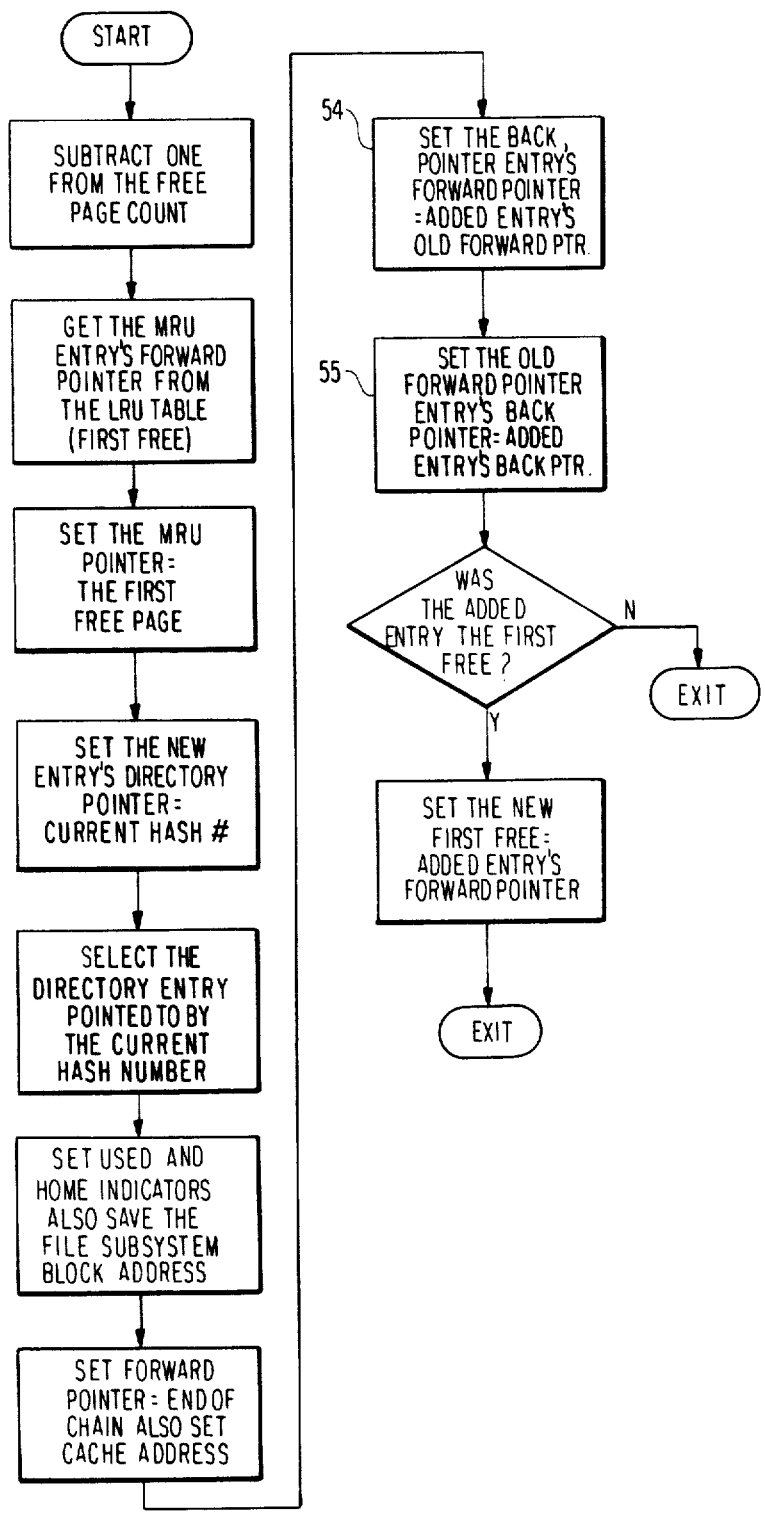
FIG. 8 ADD A PAGE TO THE CACHE USING THE CURRENT HASH NUMBER

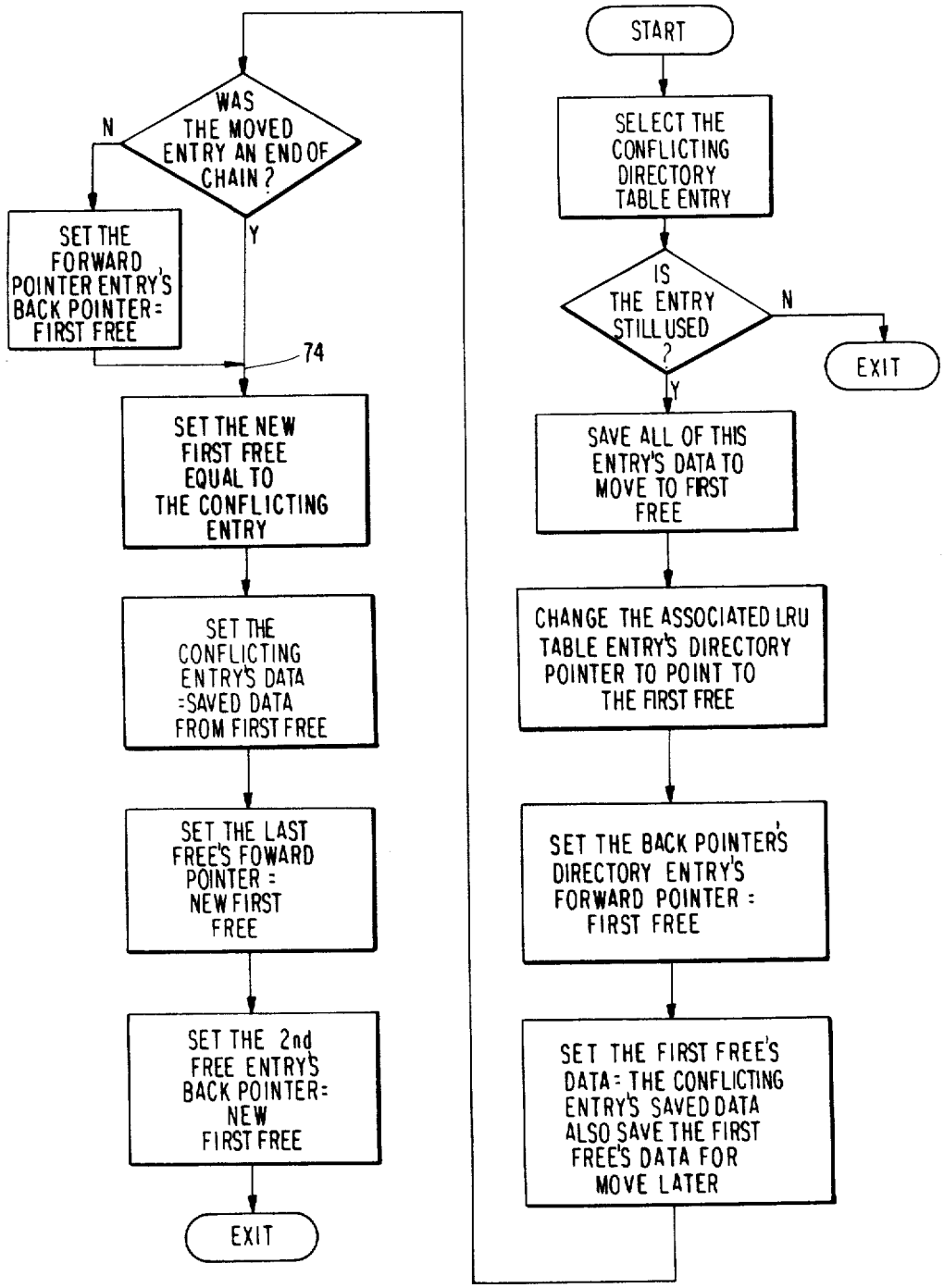
FIG. 11  SWAP THE CONFLICTING ENTRY WITH THE FIRST FREE

FIG. 14
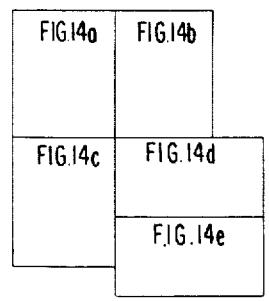
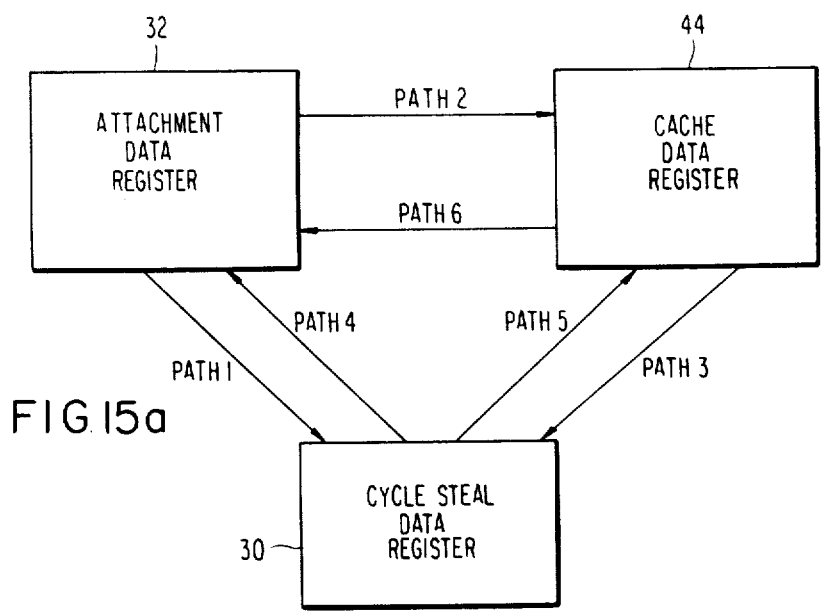
FIG. 15a
FIG. 15b
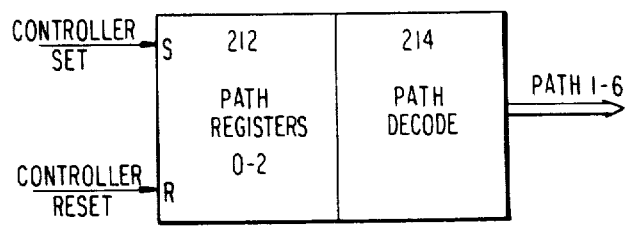

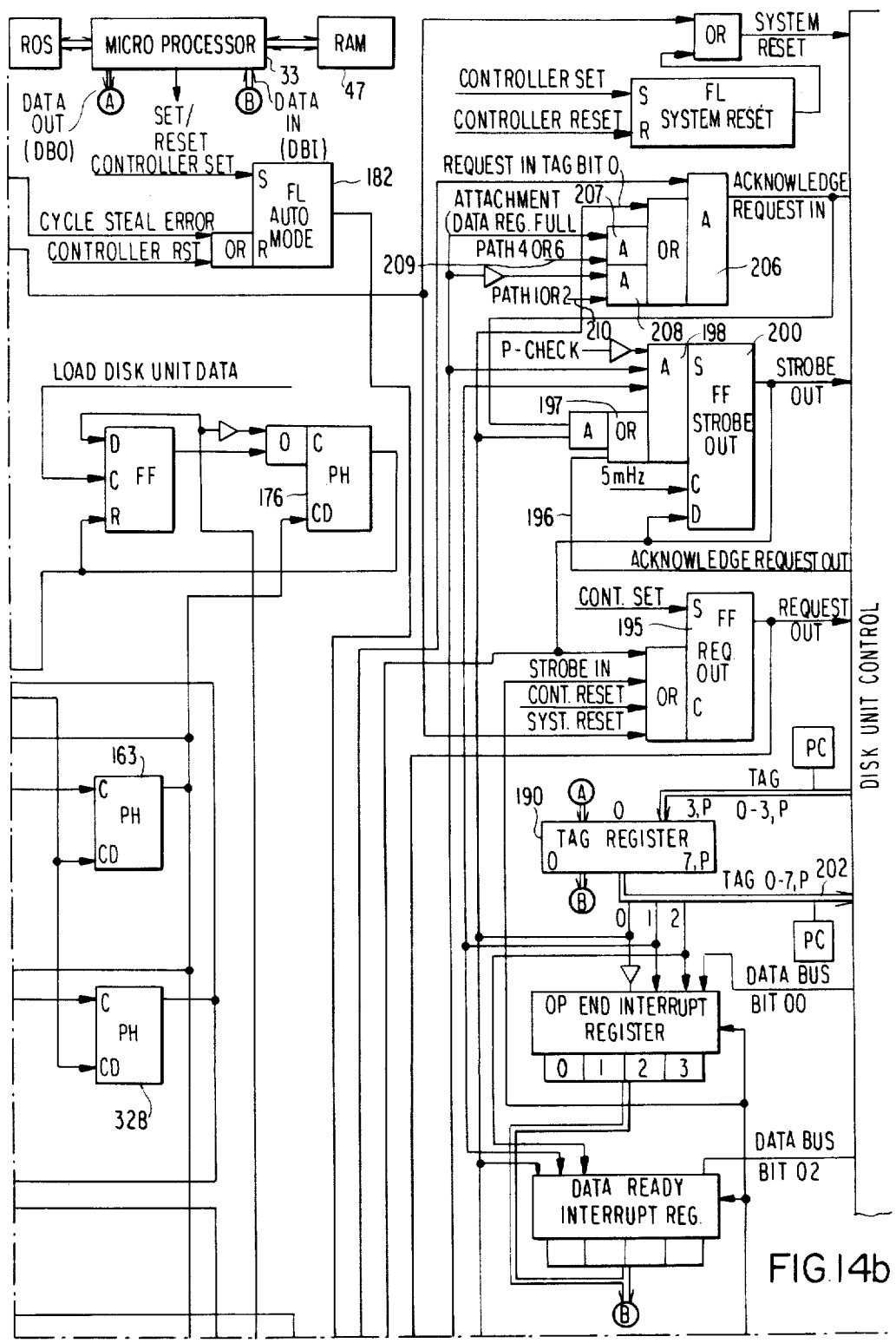

I/O STORAGE CONTROLLER CACHE SYSTEM WITH PREFETCH DETERMINED BY REQUESTED RECORD'S POSITION WITHIN DATA BLOCK

BACKGROUND OF THE INVENTION

This invention is related to data processing devices, and more particularly to data processing devices including a host processor and a plurality of attachment devices in a storage hierarchy.

In data processing systems, it is common to have one or more attachment devices, e.g., storage disks, for storage and retrieval of information. For example, in U.S. Pat. No. 4,038,642 to Bouknecht et al issued on July 26, 1977 and assigned to the same assignee as the present application, a plurality of I/O devices and associated I/O controllers are commonly connected to a host processor via an I/O interface bus. Each of the I/O attachment devices includes a microprocessor which cooperates with the host processor to implement data transfer between the main storage and the I/O device. An improvement on the Bouknecht et al system is described in U.S. Pat. No. 4,246,637 to Brown et al where a single I/O controller including a microprocessor is coupled to the host processor, and the plurality of data storage attachment devices are coupled to the output of the I/O controller so that a single microprocessor can coordinate data transfers to and from a plurality of attachment devices.

A problem in each of these systems is that each time the host processor requires data from one of the attachment devices, it must access the appropriate attachment device, and this can be a time consuming procedure. For example, in Brown et al, when data is to be transferred to the host processor from an appropriate attachment disk under Direct Program Control (DPC), command and data words are transferred from the main storage of the host processor to the microprocessor, and thence to a device data register. The appropriate coordination and control logic is exercised to retrieve the requested data from the appropriate attachment disk and to provide them to the host processor. For the reverse operation, i.e., writing into a disk from the main storage, the data to be written into the attachment storage device is loaded into the device data register and then the appropriate handshaking routines must be carried out to transfer this data into the desired attachment disk. In a Cycle Steal mode of operation, commands are provided to the microprocessor which enable it to "steal" data from the host processor main storage and load this data into the device data register, and the data is then transferred to the appropriate attachment disk in substantially the same manner as in the DPC mode.

Even though the speed of the system is improved, it is still necessary that one of the desired attachment disks be accessed in order to obtain the necessary information for the host processor. While signal processing speeds are quite fast, the time required to access an attachment storage device is limited by the necessity of physically moving the read/write heads or the storage medium, e.g. processing speeds are limited in disk subsystems by the time required for the disk to be rotated and for the head to seek the proper position.

In order to achieve improvements in operating speed, it is known to utilize a low capacity highspeed memory to store a portion of the main storage data which is most likely to be needed by the central processing unit so that many of the data requests of the cpu can be satisfied rather quickly from this small high-speed memory. Such a technique is disclosed, for example, in U.S. Pat. No. 4,035,778 issued on July 12, 1977 to Ghanem and assigned to the same assignee as the present application. Ghanem '778 discusses the use of low capacity high-speed working memories and the need to maximize the efficiency of such memories by constantly updating the memory contents to keep the data which is most likely to be needed in the near future. This could be done via a Least Recently Used (LRU) technique wherein the least recently used data is constantly being replaced, or could be done through the more complex technique of Ghanem wherein a complicated statistical algorithm is used to allocate memory capacity among multiple users. Ghanem '778, however, is directed to the allocation of working memory space among competitive programs, but there is no suggestion of utilizing a similar technique in a multiple disk I/O controller. Further, in order to determine if requested data is presently stored in the high-speed working memory, it is necessary to compare the data request identification with the entire contents of the working memory, which may be a time consuming operation. Still further, the only data transferred to the working memory is the data requested by the CPU, and efficiency could further be improved by transferring some additional data which has not yet been requested but is nevertheless likely to be required in the near future.

SUMMARY OF THE INVENTION

It is an object of the present invention to provide a data processor with substantially increased operating speed.

It is a further object of this invention to provide such a data processor in which it is not necessary to access an attachment data storage device e.g. a disk unit, each time the host processor requires new data.

It is a still further object of this invention to provide a high-speed cache memory wherein it can be quickly determined if a requested quantity of data is presently stored in the cache without the necessity of examining the entire contents of the cache.

It is a still further object of this invention to provide a cache memory having an increased efficiency by transferring to the cache memory certain additional data other than that already requested by the host processor.

Briefly, these and other objects are achieved according to the present invention by an input/output data storage controller having a cache memory for storing data which is most likely to be needed by the host processor in the immediate future. When the host processor subsequently requests additional data, there is a substantial likelihood that the data may be found in the cache memory and quickly transferred to the host processor main storage memory without the necessity of accessing the I/O devices. In the preferred embodiment of the invention, each time data is transferred from an I/O device, it is also stored in the cache memory, since there is a statistical probability that this data will be used again in the near future. If the cache memory is full, storage of newly requested data is enabled by replacing the Least Recently Used block of data in the cache memory, since this data is the least likely to be needed again by the host processor.

When a particular record of data is requested by the host processor, which data is not presently in the cache memory, the controller will transfer to the cache memory a block of data containing the requested record. There is a statistical likelihood that records immediately subsequent to the requested record may also be needed in the near future and, if the requested record is located near the beginning of the transferred block, the new data later requested should also be in this block. If, however, the requested data record occurs during a later portion of the transferred data block, it may be advisable to transfer one or two additional blocks of data on the premise that some data from these additional blocks will soon be needed. It may also be desirable to automatically adjust the thresholds at which one or two additional data blocks are transferred in order to maximize the efficiency of the system.

The controller maintains a directory table having a number of entries for listing the contents of the cache memory. Each requested data block will have a single corresponding hash entry number which may, for example, be the remainder of the disk system address divided by a prime hashing number such as 311. Each entry in the directory table will be identified by a unique hash entry number, and when a particular block of data is stored in the cache memory it will be listed at its "home" position in the directory table, i.e., the position in the directory table identified by the hash entry number of that data block. If more than one data block in the cache memory have the same hash entry number, one will be stored at its home position and the others will be stored at positions which are not the home position of any data block currently stored in the cache memory. These data blocks having te same hash entry number will then be connected in a conflict chain beginning with the home position and linked together via forward and backward pointers at each of the various directory table entry positions. Thus, in most cases it is only necessary to examine the home position of the requested data block to determine if it is currently stored in the cache memory, and at worst it is still only necessary to examine the home position and a few conflict positions.

BRIEF DESCRIPTION OF THE DRAWINGS

This invention will be more clearly understood from the following description in conjunction with the accompanying drawings in which:

FIG. 1 is brief block diagram of a data processing system according to the present invention including a cache memory;

FIG. 3 is a flow chart illustrating a search through the directory table for a requested data block;

FIG. 4a is a brief explanatory diagram of a directory table search wherein the requested data block is not in the cache memory;

FIG. 4b is a brief explanatory diagram of a directory table search wherein the requested data block is in the cache memory;

FIGS. 6a-6c are a flow chart illustrating in more detail the cache algorithm indicated in FIG. 5;

FIG. 7 is a flow chart illustrating in more detail the step in FIG. 6b of adding a block to the cache;

FIG. 8 is a flow chart illustrating in more detail the step in FIG. 7 of adding a block to the cache using the current hash number;

FIGS. 9a and 9b are explanatory diagrams of the management of the "free chain" maintained in the directory table of FIG. 2a;

FIGS. 10a-10d illustrate various cache memory operations performed in the flow chart of FIG. 7;

FIG. 11 is a flow chart illustrating in more detail the step in FIG. 7 of exchanging the conflicting and first free entries of the directory table;

FIG. 15a is a block diagram illustrating the various data transfer paths in the controller according to the present invention;

FIG. 15b illustrates a path control circuit for providing control signals to various logic elements in the controller of FIGS. 14a-14e.

DETAILED DESCRIPTION OF THE INVENTION

Figures 2A, 2B:
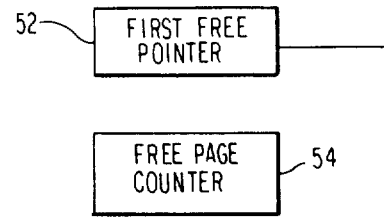
FIGS. 2a and 2b are explanatory diagrams of a directory table and least recently used table, respectively, maintained in the RAM of FIG. 1.

FIG. 1 illustrates a data processing system including a host processor 10 and associated main storage memory 11, a device control unit 14 which is coupled to at least one attachment device (e.g., a disk unit) 16, display terminals 18 and an I/O controller 20 according to the present invention. The controller 20 controls the transfer of data and other information between the host processor 10 and the devices 16 via the appropriate control units 14.

The host processor communicates with the controller 20 via a channel interface bus 21 which, in turn, communicates with the device control units via a device interface bus 22.

For the sake of example, it will be assumed herein that the host processor 10 is a Series/1, Model 5 minicomputer manufactured and marketed by International Business Machines (IBM) Corporation of Armonk, N.Y., and described in the IBM Manual entitled "Series/1, Model 5, 4955 Processor and Processor Features Description", IBM Order No. GA34-0021-3 (Fourth Edition dated September, 1976), and U.S. Pat. No. 4,038,642 identified above. Further, the controller 20 according to the present invention is an improvement over the controller disclosed in U.S. Pat. No. 4,246,637 to Brown et al, and the microprocessor may be of the type described in U.S. Pat. No. 4,173,782. The disclosures of all of these references are incorporated by reference into the present application as if fully set forth herein.

As shown in FIG. 1, the channel interface bus 21 within the controller 20 comprises a channel data bus 23 and a channel control bus 24. Similarly, the device interface bus 22 comprises a device data bus 25 and a device control bus 26. For automatic high-speed cycle steal operations, data buses 23 and 25 are interconnected by a cycle steal data register 30, a bypass data bus 31 and an attachment device register 32. Each of the buses 23, 25 and 31 is either a bidirectional bus or a pair of unidirectional buses for data transfer in either direction.

For non-automatic cycle steal operations, data and other information can be transferred between the host processor and a microprocessor 33 via channel data bus 23, cycle steal data register (CSDR) 30 and a microprocessor data bus comprising Data Bus In (DBI) bus 34 and Data Bus Out (DBO) bus 35. Similarly, data and other information can be transferred in either direction between the microprocessor 33 and a device control unit 14 via device data bus 25, attachment device data register 32 and microprocessor data busses 34 and 35.

The channel control bus 24 and device control bus 26 each communicate with microprocessor 33 via coordination and control (handshake) logic 37 and 38 under the control of high-speed control hardware 36. Microprocessor 33 is also in communication with control hardware 36 via microprocessor busses 34 and 35. In response to a start cycle steal command from the host processor 10, microprocessor 33 functions to provide various initial parameters and values to the control hardware 36. Thereafter, the control hardware 36 is capable of automatically controlling the data transfer operations without further intervention from the microprocessor 33. In other words, for the case of an automatic cycle steal operation, the microprocessor 33 provides the initial set-up of the control hardware 36, whereafter the control hardware 36 takes over and runs the actual data transfer operations. This includes the supply of register load pulses via lines 39 and 40 to the CSDR 30 and attachment device data register (DDR) 32. A load pulse on line 39 transfers data from the DDR 32 to the CSDR 30 via bypass data bus 31, and a load pulse on line 40 transfers data in the opposite direction. The automatic control provided by the control hardware 36 further includes performance of the appropriate handshaking sequences on the channel control bus 24 via handshake logic 37 for transferring data between the host processor and the CSDR 30, and the performance of appropriate handshaking sequences on the device control bus 26 via handshake logic 38 for transferring data between the DDR 32 and the device control unit.

The controller 20 according to the present invention further includes a cache memory 42 and associated cache data register (CDR) 44. As with the other data registers, CDR 44 is coupled to microprocessor via microprocessor data busses 34 and 35 and receives a load pulse on line 45 from the control hardware 36. The CDR 44 is also connected with the CSDR 30 and DDR 32 via bypass bus 31. When data is requested by the host processor, the microprocessor first determines if the requested data is presently stored in the cache memory 42. If so, this is referred to as a "read hit", and the requested data is transferred to the host processor via cache data bus 46, CDR 44, bypass data bus 31, CSDR 30 and channel data bus 23. If some or all of the requested data is not contained in the cache memory 42, a situation referred to as a "read miss", the data is then obtained from the attachment devices in a conventional manner and then transferred to the cache memory 42 via bypass bus 31, CDR 44 and cache data bus 46. As will be described in more detail below, it may also be desirable to "prefetch" additional data other than that requested by the host processor and to store this additional data in the cache memory on the assumption that it will soon be requested by the host processor. The requested data is then transferred to the host processor from the cache via bus 46, CDR 44, bypass data bus 31, CSDR 30 and channel data bus 23.

After the host processor finishes an operation on a particular block of data, it may wish to rewrite the new data back into the original attachment device storage location. In this instance, the microprocessor determines if the contents of this location of the attachment device are presently stored in the cache memory. If so, a "write hit" condition occurs, and this data should be updated in the cache memory since it has now been changed. If the contents of the addressed device are not presently within the cache memory, the new data will be written into cache and from there to the disk if an entire block of data is being rewritten, otherwise, it will be written directly to the disk.

A preferred technique of cache memory management will now be described. An important requirement for effective usage of disk cache directory space is that fixed block operation be implemented. In such a design concept, all disk addresses are considered to fall within the fixed boundaries of a starting disk address and an ending disk address. Each record stored on a disk has a unique Relative Block Address (RBA) determined by its disk drive number, head number, cylinder number and record/sector position, and the RBA's are further placed within a higher level blocking organization. Thus, in the system according to the present invention, each record has a uniquely associated RBA given by:

$$RBA = k_1(\text{cylinder number}) + k_2(\text{head number}) + \text{record number} + k_3(\text{drive number})$$

where $k_1$, $k_2$ and $k_3$ are constant determined from the design of the disk drive unit. For cache memory management purposes to be described in more detail below, blocking organization is achieved by dividing the RBA by the fixed block length in records. Thus, $$\text{BLOCK NUMBER} = RBA/(\text{BLOCK LENGTH})$$

where the block length is a system design parameter. In the following description, it is assumed that one "record" of data includes 256 bytes, one block includes 8 records, one page includes one block (2,048 bytes), and the total cache capacity is 192 pages. Other memory configurations, however, are equally possible.

With this management technique, the address of each record of information may be identified by a block number and a record address relative to the identified block. Since there are 8 records per block, the block number of a record can be determined by dividing the RBA by eight. Hashing is accomplished by dividing the block number by a hashing factor which is a prime number, and using the remainder thereof as the entry point (hash entry number) to a directory table. In accordance with the preferred embodiment of the present invention, the hashing factor is chosen to be 311, although it should readily be appreciated that other hashing factors could be used if desired. Finally, the file subsystem block address is defined as the whole quotient of the block number and the hashing factor, without regard to the remainder thereof.

A directory table of the cache memory contents is maintained in a random access memory (RAM) 47 in FIG. 1. The format of the directory table is as shown in FIG. 2a.

The use of the directory table is a key concept in minimizing the overhead in locating a data block in cache. The directory table represents a high level index to the cache, wherein a list is maintained of what is presently in cache, and where it may be found. The directory table keeps track of the contents of cache at all times, correlating cache contents with blocks of data on disk, and comprises a free/used indicator (1 bit) a home indicator (1 bit), the file subsystem block address (11 bits), a backward pointer (9 bits), a forward pointer (9 bits), and the cache address (8 bits). The number of bits can obviously be varied according to particular system requirements.

The free/used indicator indicates whether the entry is currently used to identify a particular block of data in cache. The home indicator, as the name suggests, indicates whether the entry is a "home" entry, as will be discussed in more detail below. The file subsystem block address together with the hash entry number uniquely address a block of data on a disk. The cache address indicates where in cache the data block identified by the file system block address and hash entry number resides. Finally, the forward and backward pointers are used to link the entries in a chain.

Any data block which may be addressed produces a single hash entry number. In general, however, a multiplicity of data blocks will produce the same hash entry number. These multiple data blocks produce what are termed "conflict entries", as opposed to a "home entry" for the original data block for a given hash entry number. A search for a particular data block must be conducted among the multiple conflict items to determine whether the item is in cache. Thus, the hashing factor should be selected to keep the average length of the conflict list within acceptable bounds.

Assuming that a user requests data to be read from or written into a disk or other storage unit, the microprocessor calculates the hash entry number and a check of the directory table is made to see if the requested data is in the cache memory. With reference to FIG. 3 the hash entry number is used as the starting point for the search. For a read operation, at the directory location identified by the hash entry number, the free/used indicator bit is checked to initially determine whether the entry has been used. If unused, the requested data is not resident in cache, a hit flag is reset to indicate a "read miss", and a "free home" is indicated. The requested data is then retrieved from the appropriate disk and stored in the cache memory and can be indexed at this location in the directoy table.

If the entry is used, a check of the home indicator is made to determine whether the entry point is a "home" entry or a "conflict" entry. By definition, all blocks in cache must produce an entry point at a home entry rather than a conflict entry. Thus, if the entry point is a conflict entry, it can be immediately determined that the requested block is not in cache. FIG. 4a illustrates a situation where the requested data is not in cache. If the requested block produces hash entry point 1, which is a conflict entry, it can immediately be determined that the requested block does not exist in cache. Thus, for entry point 1 in FIG. 4a, the requested block is not in cache, the hit flag is reset to indicate a read miss, and a "used home" is indicated, as shown in FIG. 3.

The possibility exists, however, that a data block not in cache may produce an entry point at a home entry, such as hash entry point 2 in FIG. 4a. In this case, the search of the linked chain of entries must be made to determine whether the block is in cache.

First, as shown in FIG. 3, the file system block address (quotient) is compared with the relative address of the requested block to determine whether the directory table entry corresponds to the requested block. Since it is not the requested block, a further check is made to determine whether the present entry is the end of chain (EOC). Since it is not, the forward pointer of the entry at point 2 is used as the next point of entry, and the process iteratively continues until the end of chain is indicated by the last entry's forward pointer, at which point the hit flag is reset to indicate a read miss, end of chain is indicated, and the hash entry number is pointed to the end of the chain.

If at any time during this iterative search the requested data block is located, the block's cache address is saved and the hit flag is set to indicate a read hit. FIG. 4b illustrates the situation where the requested block is in the cache at the corresponding directory table entry indicated by an asterisk in the Figure. The original hash entry number will point to a home entry whenever the requested block is located in cache, as will be explained below with reference to FIGS. 8, 11 and 12. The original hash entry need not directly point to the entry in the directory table corresponding to the requested block but, as shown in FIG. 4b, the requested block may be found at the second conflict entry by following the forward pointers.

Also maintained in the RAM 47 is a Least Recently Used (LRU) table having a format shown in FIG. 2b. The LRU table has one listing for each page in the cache memory, a maximum of 192 pages in this embodiment. The forward pointer in each listing of the LRU table points to the listing of a more recently used page, with the forward pointer of the most recently used listing pointing to the first free page. Similarly, the backward pointer of each LRU listing points to a lesser used page, with the last of that chain being the least recently used page. The directory pointer in each LRU listing points to a particular one of the 311 entries of the directory table. Pointers 50, 51 and 52 are preferably provided to point to the least recently used and most recently used entries in the LRU table and to the first free page in the Directory table. A free page counter 54 may also be provided. In accordance with the present invention, when a new page is to be written into the cache memory and there are no free pages available, the least recently used (LRU) page is deleted from the cache memory as will be explained in more detail below. This newly written page then becomes the most recently used listing in the LRU table, and its backward pointer points to the previous most recently used listing with its directory pointer pointing to the corresponding hash entry number in the directory table.

For a write operation, a "write through" technique is implemented whereby the data is written into the cache memory and thence to a disk file, if it is a full data block, unless the data is already in cache in which case it is merely transferred from the cache memory to the disk file while the appropriate disk page is updated to most recently used status. However, if the data to be written exceed a predetermined quantity, it is transferred directly from the system to the disk file and any corresponding page in the cache memory is deleted. The data is also transferred directly from the system to the disk if it is not presently in cache and is less than a full data block.

With these basic directory management techniques having now been explained, the operation of the I/O controller according to the present invention will now be explained.

Figure 5:
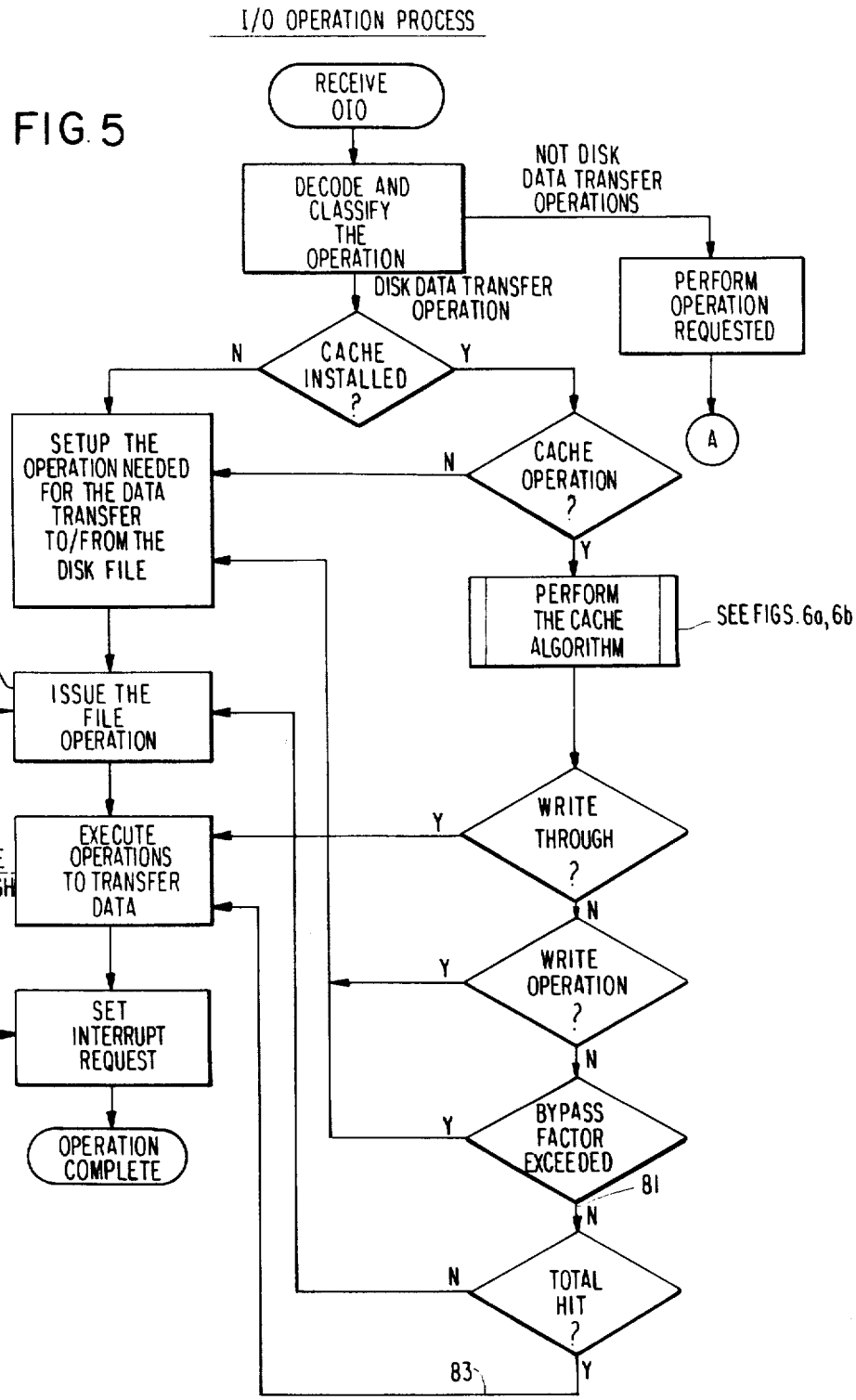
FIG. 5 is a flow chart illustrating the overall operation sequence followed by the microprocessor in the I/O controller.

FIG. 5 is a brief flow chart illustrating the operation of the I/O controller according to the present invention. As shown in FIG. 5, the microprocessor examines the command and, if the command does not require data transfer to or from a disk, the requested operation is performed and the operation is completed by setting the interrupt request. Assuming that a disk data transfer operation is requested, the microprocessor then determines if a cache memory has been installed in the system. If not, the system operates in a manner substantially similar to that described in the above-referenced U.S. Pat. Nos. 4,256,637 and 4,038,642.

If a disk data transfer operation is requested, and a cache memory installed, the microprocessor then determines if a cache memory operation has been requested and, if so, the controller according to the present invention performs a cache algorithm to be described in more detail below which is essentially concerned with the management of data within the cache memory.

After performing the cache algorithm, if a write operation is requested if write through is to be implemented, the microprocessor implements all of the data transfer operations set up in the cache algorithm and must also issue the file operation to access the disk file for the cache-to-disk transfer. If write-through is not to be implemented but data is to be written directly to the disk file, the required data transfer operations will not have been set up in the cache algorithm, and the microprocessor sets up and implements the necessary operations to write the data from the host processor into the designated disk.

If a read operation rather than a write operation is requested, the microprocessor then determines if a by-pass factor has been exceeded. The purpose of this by-pass factor is to detect the occurrence of long sequential reference patterns. Long sequential runs tend to have less favorable reuse properties and, therefore, it would be undesirable to store this type of data in the cache memory since this would lower the hit ratio, i.e., the probability of finding the next requested data in cache. Accordingly, some predetermined number, e.g., 3072 bytes, is used as a maximum number of bytes of data which will be permitted into the cache memory on a single data transfer request. If larger amounts of data are requested on a single access, the decision is made that a sequential run is present and the data is not allowed into the cache on a miss.

If the bypass factor has not been exceeded and, if a total hit has occurred, i.e., all of the requested data is presently in the cache memory, the controller then merely executes the necessary operations to transfer the requested data from the cache memory to the host processor. If a total hit has not occurred, the requested data is then transferred from the disk to the cache memory and the appropriate operations are implemented to transfer the data from the cache to the host processor.

For read operations that are a total hit, the requisite operations are set up in the cache algorithm itself as will be described in more detail below and, as shown in FIG. 5, the step of setting up these operations can therefore be bypassed. In contrast, a non-cache operation or, a non-write through write operation, or a read operation request exceeding the by-pass factor will each require that the microprocessor set up the required operations for the data transfer to or from the disk file.

After executing the data transfer operations, the interrupt request is set as described in more detail below and the operation is complete.

Figure 6A:
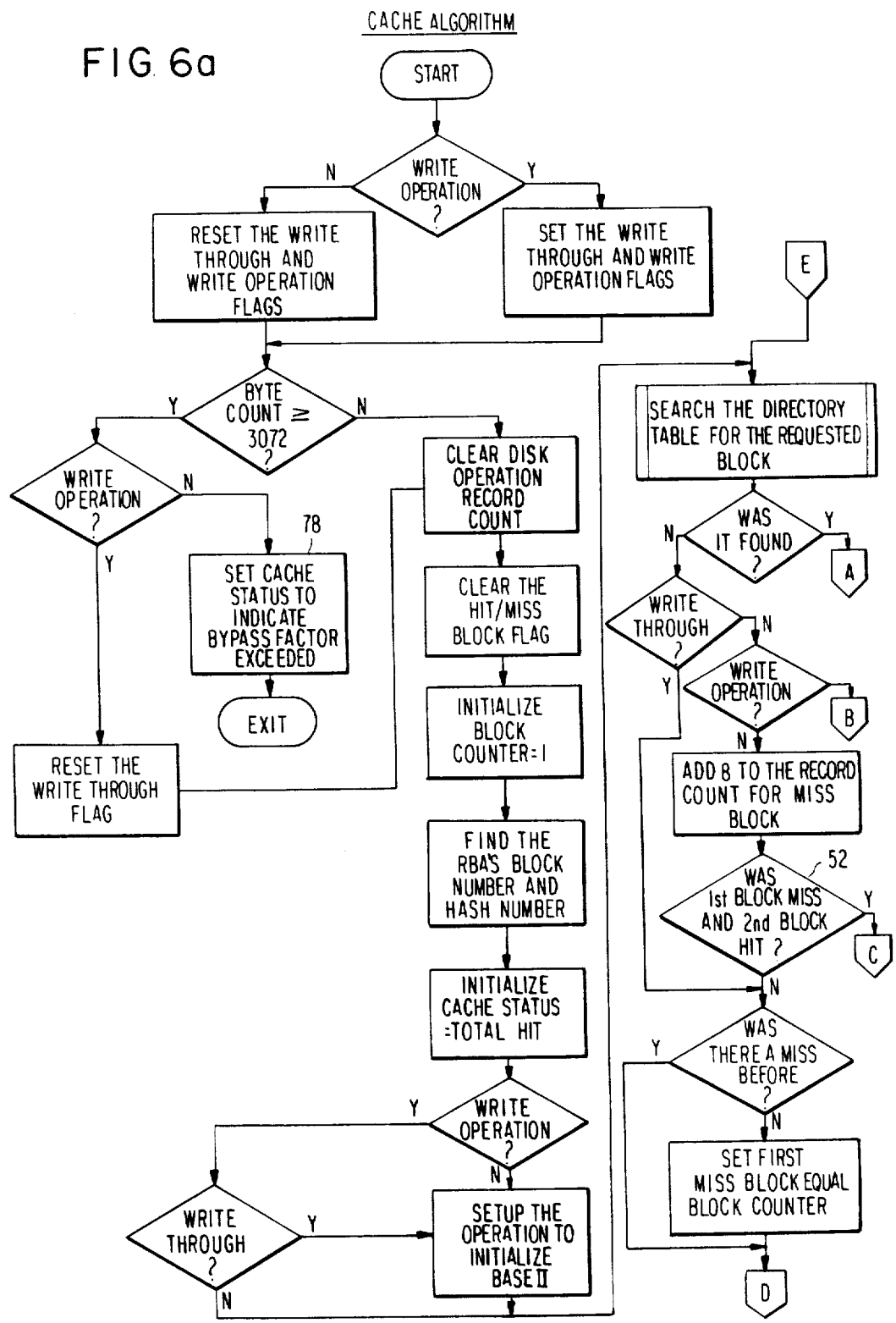
Figure 6B:
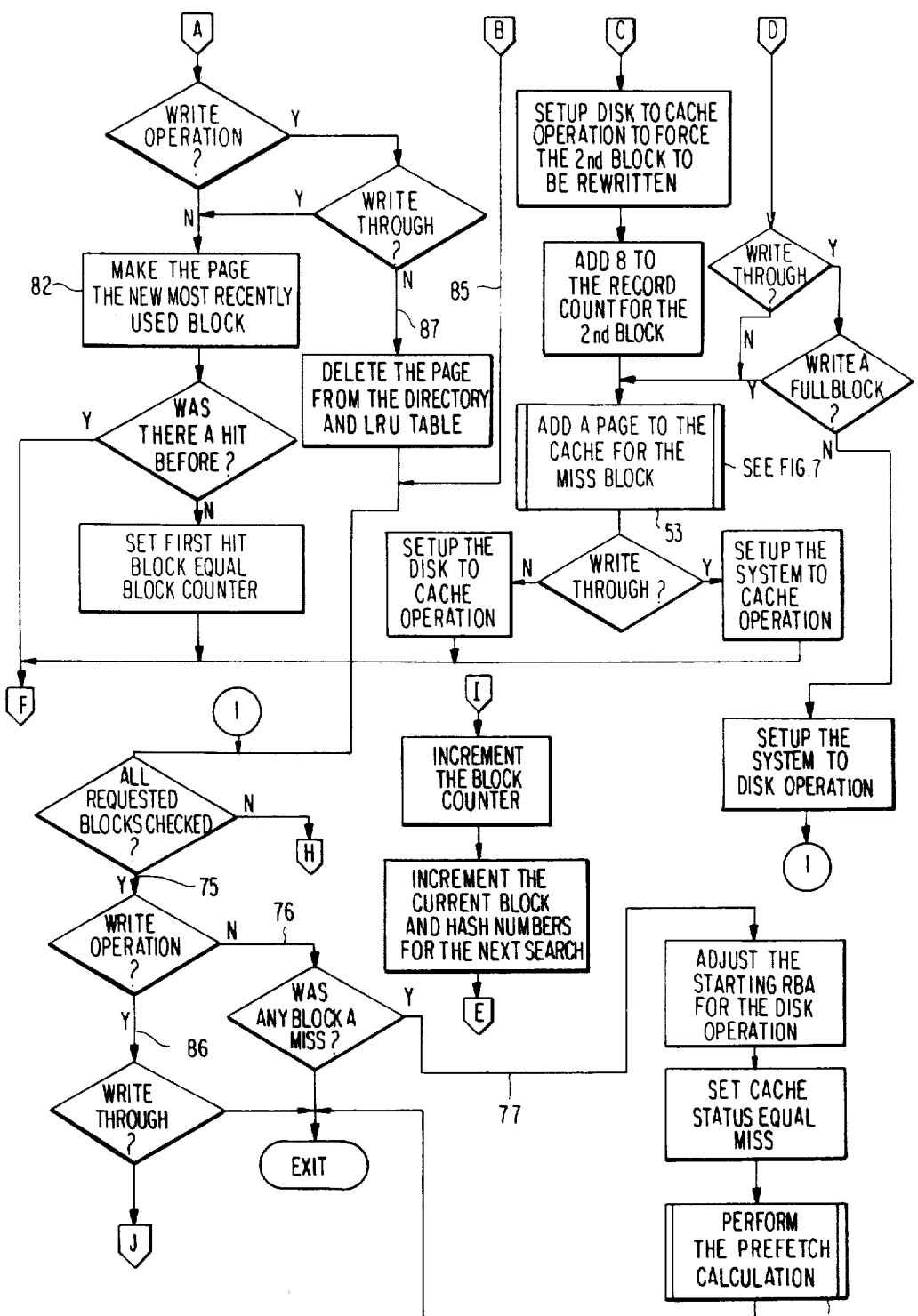

The cache algorithm operation of the controller according to the present invention will be described in more detail under the assumption that the command received from the host processor is a request for data which is not presently stored in the cache memory, thus resulting in a "read miss" situation. As shown in the flow chart of FIG. 5, if a cache is installed and a cache operation is requested, the cache algorithm is performed. A flow chart of the cache algorithm is shown in FIGS. 6a–6c. As shown therein, the microprocessor determines if a write operation has been requested and, if not, the write through and write operation flags are reset to indicate a read operation. The microprocessor then determines if more than 3072 bytes of data are requested and, if so, the cache status is set to indicate that the by-pass factor has been exceeded. It should again be noted that the by-pass factor need not be 3072 bytes but could be some other suitable number, or indeed the use of a by-pass factor could be eliminated entirely if it is not desired to eliminate long sequential runs from the cache memory.

Assuming the by-pass factor has not been exceeded, a disk operation record counter and hit/miss block flags are cleared. A block counter is then initalized to 1, and the microprocessor receives the relative block address (RBA) for the disk together with the hash number, e.g., 311. The cache status is then initialized to TOTAL HIT. Operations for the initialization of base II are then set-up to enable the cache to communicate with the host processor main store and a search of the directory table is performed in the manner described above with reference to FIG. 3.

If the requested block is not found in the cache directory, the hit flag will be reset as shown in FIG. 3 thereby indicating a miss. It should be noted that the "hit" flag which is either set or reset in the operation of FIG. 3 is to be distinguished from the "hit block" or "miss block" flags which are reset at the beginning of the cache algorithm of FIG. 6a. The hit flag is used to indicate whether or not the present block of data is in the cache, whereas the hit block and miss block flags are used to indicate the first block at which a hit or miss occurred, respectively, as will become more clear as the description continues.

Returning to FIG. 6a, after the directory table search the microprocessor examines the hit flag to determine if the requested data block was found. For a read operation, and assuming the data block was not found and the hit flag was reset, the microprocessor then adds a count of 8 to the record counter to indicate that at least 8 records (1 block) of data will be transferred from the disk to the cache. This number of records is chosen as an example only and may be varied to meet particular system demands. The miss block counter will then be set to a value of 1 and a page will be added to the cache. The microprocessor will then set up the operations required to transfer the missed block from the disk to the cache and will also set up the required operations to transfer the data from the cache to the host processor. Assuming that only a single data block was requested, and that this data block was a "miss", the RBA will be adjusted to the proper starting point for the transfer of the requested data from the disk, the cache status will be set to "miss" and a prefetch calculation will be performed. The system then operates in the manner illustrated in FIG. 5.

When multiple data blocks are requested, the cache algorithm according to the present invention is implemented such that a three-block "miss-hit-miss" situation is treated as a three block miss, since an overall savings in time will be effected by transferring three blocks of data in one operation rather than transferring two smaller blocks of data in two operations. The detection of the "miss-hit-miss" condition is as follows. Referring back to FIG. 6a and the following Table I, prior to initiating the first search of the directory table the disk operation record counter, hit block flag and miss block flag are all cleared and the block counter is initialized to a value of 1. A first search of the directory table is implemented utilizing the hash entry number of the first requested block as determined from the RBA of that block. Assuming that the data block is not found, the hit flag is reset during the directory search shown in FIG. 3. At the end of the directory search, as shown in FIG. 6a, the microprocessor examines the hit flag and determines that a "miss" has occurred. Accordingly, the record counter is incremented by 8 in order to indicate that 8 records (1 block) will have to be transferred from disk to cache. The conditions at this point are illustrated at $T_1$ in Table I.

TABLE I

| Time | Block Counter | Record Counter | Hit Block Flag | Miss Block Flag | Hit Flag |
|---|---|---|---|---|---|
| $T_1$ | 1 | 8 | 0 | 0 | 0 |
| $T_2$ | 1 | 8 | 0 | 1 | 0 |
| $T_3$ | 2 | 8 | 0 | 1 | 0 |
| $T_4$ | 2 | 8 | 2 | 1 | 1 |
| $T_5$ | 3 | 8 | 2 | 1 | 1 |
| $T_6$ | 3 | 16 | 2 | 1 | 0 |

In the decision operation indicated at 52 in FIG. 6a, the microprocessor examines the hit block and miss block flags to determine if a "miss-hit-miss" situation has occurred. Since it has not, the microprocessor then checks the hit block and miss block flags to determine if there were any previous misses. Since this is the first data block being requested, the answer is no, and the miss block flag is then set to a value equal to that in the block counter. This situation is illustrated at $T_2$ in Table I, and it should be noted that the miss block flag indicates the block number at which the first miss occurred. As shown in FIG. 6b, the microprocessor then adds a page to the cache and sets up the disk-to-cache and cache-to-host processor (FIG. 6c) operations required for the transfer of the missed data block.

Since all requested blocks have not yet been checked, the block counter is then incremented by 1 and the block number and hash entry number for the second data block are calculated. The microprocessor then returns to the point in the cache algorithm immediately before the directory search, and the directory search of FIG. 3 is repeated for the second data block. At this point, the counter and flag conditions are as shown at $T_3$ in Table I.

The directory is then searched for the second data block and, if found, the hit flag is set and the cache address of this second block is saved as shown in FIG. 3. Referring again to FIG. 6a, the microprocessor then examines the hit flag and finds that the second block of data was found during the second search, and the microprocessor then branches to path "A" of the algorithm shown in FIG. 6b. The LRU table is updated to indicate that this second block of data is now the most recently used block and, since there was no prior hit, the hit block flag is set to a value presently in the block counter, i.e., a count of 2. The conditions at this point are illustrated at $T_4$ in Table I with the miss block flags and hit block flags indicating the block numbers of the first miss and first hit, respectively. As shown in FIG. 6c, the microprocessor then sets up the required cache-to-host processor operations for the second data block.

Since all requested data blocks have still not been checked, the block counter is again incremented by 1, the block number and hash entry number for the third data block are calculated, and the microprocessor returns to the point in the algorithm immediately before the directory search. The conditions at this point are illustrated at $T_5$ in Table I. The directory table is then searched according to the procedure illustrated in FIG. 3 and, assuming that the third requested data block is not found, the hit flag to reset to indicate a read miss. At the end of the directory search operation, the microprocessor examines the hit flag to determine whether or not the third requested data block was found. If it was found, the microprocessor would follow the cache algorithm path "A" illustrated in FIG. 6b, making the third requested data block the most recently used block in the LRU table. Since there was a previous hit, the setting of the hit block flag would be skipped and the cache-to-host processor operations would be set up for the third data block.

Assuming that the third data block is not found in the directory search, a value of 8 would again be added to the record counter so that, immediately prior to the decision 52 in FIG. 6a, the counter and flag conditions would be as illustrated at $T_6$ in Table I. The microprocessor would examine the hit and miss block flags and see that the first block was a miss while the second was a hit thereby resulting in the "miss-hit-miss" condition, and the algorithm path "C" would be followed in FIG. 6b. The required operations for transferring the second block from disk to cache would be set up and an additional increment of eight would be made to the record counter to indicate this additional data transfer. A page would be added to the cache to accommodate the missed data block, and the cache algorithm would then be completed as before. Note that no additional page is added to the cache for the second data block since this is merely to be rewritten.

Block 53 in FIG. 6b represents a portion of the cache algorithm whereby a page is added to the cache for each missed block of data. This will be described in more detail with reference to FIG. 7. First, the number of free pages remaining in the cache memory are counted. This could be done, for example, by polling (free page counter 54 in FIG. 2A) or by counting the number of listings in the LRU table having no entry in the directory pointer column. If there are no free pages currently available, the least recently used page, determined from the LRU table, is deleted from the cache. Next, the directory table is examined to determine if the hash entry number corresponding to the block being added is already used. This can easily be determined by examining the free/used indicator in the first column of the directory table of FIG. 2a. If the entry is not already used, a page is added to the cache using the current hash number in the simple manner illustrated in FIG. 8. The free page count is decreased by 1 and the forward pointer of the most recently used entry (which points to the first free page) is examined to determine where the new block of data is to be stored. The most recently used pointer 51 in FIG. 2b is then set to the value of this new page, and the directory pointer of the new page listing is set to the value of the current hash entry number. The microprocessor then goes to the entry of the directory table identified by the current hash entry number and sets the free/used indicator to the "used" state, the home indicator to the "home" state and enters the subsystem block address of the new block. The forward pointer of the new entry is then set to indicate the end of a chain, and the cache address at which the new block of data is to be stored is also entered.

Operations 54 and 55 in FIG. 8 are required to maintain a proper "free chain", i.e., a chain of free pages. The free, or unused, entries in the directory table are arranged in a chain via their forward and backward pointers, and it is now desired to utilize one of the entries in this chain, i.e., the entry corresponding to the current hash entry number. Thus, as shown in FIG. 9a, the various entries may be chained together and it is now desirable to utilize the entry 56. Since this will break the free chain, it is necessary to reroute the chain around the newly used directly table entry. Prior to using this directory table entry, the backward pointer of entry 56 pointed to the previous free entry 57 and the forward pointer of entry 56 pointed to the next free entry 58. In rerouting the chain, the microprocessor follows the back pointer of entry 56 to the entry 57 and then replaces the forward pointer of entry 57 with the original forward pointer of entry 56 so that the forward pointer of entry 57 will now point to entry 58. The microprocessor then follows the original forward pointer of the entry 56 to the entry 58 and replaces the backward pointer of entry 58 with the original backward pointer of entry 56, so that the backward pointer of 58 will now point back to the entry 57. The resulting new free chain configuration is illustrated in FIG. 9b where entry 56 has now been removed from the chain.

After rearranging the free chain in steps 54 and 55, the microprocessor then determines whether or not the new entry was the first free entry. For example, in FIG. 9a the first free entry is entry 57. In this case, the microprocessor returns to the cache algorithm in FIG. 6b. For purposes of conflict list management, however, it is important that the first free pointer 52 in FIG. 2a correctly designate the first free entry in the free chain. If the newly added data block uses the first free entry in the chain, i.e., entry 57, the new "first free" entry would now be entry 56 which was originally designated by the forward pointer of entry 57. Accordingly, the first free pointer 52 is updated by changing the value therein to the original forward pointer of entry 57. It should be noted that if the seized entry is the first free entry, this entry will be the first in the free chain and will therefore have no backward pointer, so that step 54 will not be necessary and step 55 will merely constitute the erasure of the back pointer in the next entry in the free chain.

FIGS. 10a-10d illustrate various possibilities which may occur upon adding a new data block to the cache memory. In each of these figures, H indicates that a particular directory table entry is occupied by a "home" entry, and C indicates that a directory table entry is occupied by a "conflict" entry. FIG. 10a illustrates the situation described above wherein the current hash entry number, i.e., the hash entry number of the new data block, has not already been used in the directory table, so that the only necessary operation is to insert the new data block directory information at this directory table entry and to rearrange the chain of free entries.

Returning again to FIG. 7, if the microprocessor determines that the home position of the current hash entry number is already occupied in the directory table, additional directory table management operations are required. A first possibility is that the home position of the new data block is already occupied by a home entry which is not part of a conflict list and therefore is itself the end of a chain. During the directory search of FIG. 3, the microprocessor will have set an End of Chain (EOC) indication and will follow program path 59 in FIG. 7. If it was necessary to delete a page in cache to make room for the current entry, and if the deleted LRU entry was the entry occupying the home position, the microprocessor will follow program paths 60 and 61 in FIG. 7. Since the entry previously occupying the home position has been deleted, the position is now free and the new page can be added to the cache using the current hash entry number as previously described in connection with FIG. 8. The result will again be as shown in FIG. 10a.

If the EOC entry occupying the home position has not been deleted to make room for the new page, the microprocessor will follow program path 62 in FIG. 7. The current hash entry number will be replaced by the hash entry number of the first free directory table entry, and the page will be added using this new current hash entry number in the same manner as previously described in connection with FIG. 8. Further, this entry will now become a conflict entry which is at the end of a chain. Accordingly, the "home" indicator of the new entry position is turned off and the backward pointer is set to point back to the original EOC entry, i.e., back to the entry occupying the home position. Finally, the forward pointer of the entry occupying the home position, which previously contained an EOC indication, is now changed to point to the newly added entry. The resulting configuration is illustrated in FIG. 10b wherein the home position 63 is already occupied by a home entry and the new entry is thus moved to position 64 which was previously the "first free" entry. The forward pointer of entry 63 is changed to point to position 64, the backward pointer of entry 64 is set to point to the position 63, and the "home" indicator at entry 64 is turned off. The forward pointer of entry 64 will be set to indicate an EOC entry as shown in FIG. 8.

A second possible situation is one in which the home position is already occupied by a home entry which is the first entry in a multiple-entry conflict list. During the directory search of FIG. 3, the microprocessor will have cycled through the entire conflict list and reached the end of the chain without finding the requested data block. A EOC indication will have been set and the current hash entry number will also have been changed to point to the end of the chain found during the directory search. Since there is already a conflict list beginning at the home entry position of the new data block, the new data block must be added to the end of this conflict list as follows. First, since the EOC indication has been set during the directory search, the microprocessor will follow the program path 59 in FIG. 7. If the EOC entry in the conflict list has not been deleted to make room for the new page, program path 62 is followed and the new entry is added to the end of the chain in the same manner as described above in connection with FIG. 10b.

If the EOC entry has just been deleted, it is replaced by the new entry as follows. First, since the previous EOC entry has been deleted, the previous penultimate entry is now the EOC entry of that conflict list. This penultimate entry number was stored by the microprocessor at step 65 in FIG. 3, and the microprocessor replaces the original EOC entry number with this stored penultimate entry number. After the EOC entry number has been changed in this manner, the current hash entry number is replaced by the "first free" entry number and the new page is added to the end of the chain as before. FIG. 10c illustrates the situation in which the home position 63 of the new data block is already occupied by a home entry which is the first entry in a conflict list comprising entries 63 and 64. The hash entry number will already have been reset to equal the EOC entry at the end of the directory search of FIG. 3, so that the entry of the new data block according to the program of FIG. 7 will first be attempted at conflict position 64. If the conflict entry at position 64 has just been deleted, the new data block will be entered there. If not, the new entry will be made at position 66 and the positions 64 and 66 will be linked together via the forward pointer of entry 64 and the backward pointer of entry 66.

The last and simplest possibility is that the home position of the new entry is occupied by a conflict entry. In this case, the program path 67 will have been followed during the directory search of FIG. 3 and no EOC indication will have been set. Accordingly, the microprocessor will follow path 68 in FIG. 7 and the conflicting entry will be moved to the first free entry position while the new entry is inserted at its home position. This situation is illustrated in FIG. 10d wherein 63 again indicates the home position of the new entry. This position 63 was already occupied by a conflict entry which is the second entry in a conflict list comprising entries 69, 63 and 71, in that order. In this situation, the conflict entry originally existing at 63 is moved to the first free entry position 72 and the forward pointer of entry 69, backward pointer of entry 71 and forward and backward pointers of entry 72 are adjusted to maintain the continuity of the conflict list. Once the conflict entry has been removed from position 63, the new entry can be made at its home position.

The technique for rearranging the directory table entries in the manner illustrated in FIG. 10d will be described in more detail with reference to the flow chart of FIG. 11 which corresponds to step 73 in FIG. 7. First the conflicting directory table entry is selected by the microprocessor and examined to determine if it is still being used. If this entry was deleted to make room for the new data block, there is no longer a conflict and the new page can be added to the cache using the current hash entry number according to the method of FIG. 8. Assuming that the entry is still used, its data is stored by the microprocessor for later transferral to the first free entry position. Thus, in the example of FIG. 10d, the conflicting entry data originally present at entry position 63 is stored by the microprocessor for latter transferral to first free entry position 72.

The conflicting entry 63 will currently occupy some position in the LRU table of FIG. 2b, and this position should not be upset merely because the data is being moved from one directory table entry to another. Accordingly, the microprocessor goes to the LRU table entry corresponding to the directory table entry position 63 and changes the directory pointer in that LRU listing to point to the first free directory table 72. Thus, entry 72 will now occupy the same priority position in the LRU table as was previously occupied by entry 63.

Next, the microprocessor goes to the entry 69 indicated by the backward pointer of 63 and changes the forward pointer of entry 60 to indicate the first free entry 72. Next, the data originally in the entry 63, including the used indicator, conflict indicator, file subsystem block address, backward pointer, forward pointer and cache address, are all transferred to the first free entry position 72. If the conflicting entry was an EOC entry, there is no subsequent entry in the conflict list which must be modified. However, if the conflict entry is not an EOC entry as is the case in FIG. 10d, the microprocessor goes to the entry 71 designated by the forward pointer of entry 72 and changes the backward pointer of entry 71 to point to the entry 72.

At this point 74 in the program of FIG. 11 the directory table configuration is unchanged in that the same conflict list order is maintained and the cache memory data identified by entry 72 maintains its same position of priority in the LRU table. The remaining steps in FIG. 11 merely restore the "free chain" to substantially its original state by making entry 63 the first free entry. This is done by first changing the first free pointer in FIG. 2a to point to the originally conflicting entry position 63, transferring all data from the original first free entry into the entry position 63, changing the forward pointer of the last free entry, which originally pointed to the first free entry 72, to now point to entry 63, and changing the backward pointer of the second free entry, which originally pointed back to the first free entry 72, to now point to entry 63. The directory table has now been placed in substantially its original form with the exception that the home entry position of the new data block is free, and the new page can be added to the cache using the current hash entry number.

Returning again to FIGS. 6a and 6b, after the microprocessor has cycled through all of the requested data blocks and reached the point 75 in FIG. 6b, and assuming again the "miss-hit-miss" situation described above, the microprocessor will have added two new pages to the cache memory to receive the missed data blocks 1 and 3, and it will have set up all of the required operations for transferring the requested data from disk-to-cache and cache-to-host processor. Since a read operation has been requested, and since at least one of the requested data blocks was a miss, program paths 76 and 77 will be followed in FIG. 6b. The purpose of path 77 is to maximize the efficiency of the cache memory by transferring additional unrequested data blocks into the cache memory in circumstances where there is a statistical probability that these additional data blocks will also soon be requested.

Consider the following typical operating sequences:
CASE I: 122, 123, 124, 125, 126
CASE II: 122, 123, 1594, 720, 124, 14, 125, 1595, 126
p1 CASE III: 127, 128, 129, 130, 131
wherein the numbers given for each case represent RBA locations in a series of read disks data requests. For a fixed block length of eight, it will be noted that all items in CASE I are associated with block 15 which includes RBA's 120-127. Thus, the first RBA in CASE 1 is relative item 3 in block 15 and the last requested RBA is relative item seven in that same block.

In CASE II, the same five RBA's have been requested, with the addition of other RBA locations from different blocks. In both examples, however, the host processor has requested data from a short ascending sequence of RBA locations. The time for completion of the sequence is relatively short, generally within a span of two hundred disks references or less, and the given sequence of RBA's 122-126 may be repeated or partially repeated a few hundred disks requests later. Assuming that at the beginning of operation block 15 is not in the cache memory, a read miss will occur for RBA 122 and all records in block 15 will be transferred into the cache memory. The first request will thus involve a performance penalty while block 15 is being transferred into the cache memory, but the following requests for RBA's 123-126 will result in read hits involving considerable performance advantage. Empirical evidence suggests that it is very unlikely to encounter in the near future a request for RBA's 120 or 121, and these items are thus kept in the cache memory at a small penalty. The penalty in storing records 120 and 121 could be avoided by storing a block of data in the cache memory starting with the first requested record, but this would be highly impractical in terms of system complexity.

The "prefetch" operation implemented by path 77 of FIG. 6b is generally directed to the type of operation indicated in CASE III. In CASE III, the request for record 127 will result in a read miss causing all of block 15 to be transferred from disk to cache. The next request for RBA 128 is not a part of block 15, however, and this request will result in a read miss so that block 16 will be brought into the cache storage. Thus, two independent disk read operations would be required in CASE III. This problem in CASE III is one of improper alignment between the boundaries of the fixed block adopted for disk/cache storage and the boundaries of the sequential pattern issued by the user.

In order to avoid the requirement of two independent disk read operations in CASE III, it is a feature of the present invention that an additional block or blocks of data may be transferred to the cache memory during the first disk read operation.

In the preferred embodiment of the present invention, the statistical probability is considered to be a function of position in a particular block of the last record of the current operation requested by the host processor. The prefetching operation is thus based upon a threshold comparison of the requested record location within a fixed block boundary. As an example, the threshold could be set at the ⅝ location within a block. In the case of block 15, the threshold would be at RBA location 124 which is the fifth record in the block. Read miss requests for RBA's 120-123 would not meet the threshold criterion and only block 15 would be transferred to the cache, while read miss requests for RBA's 124-127 would satisfy the threshold criterion and data from both blocks 15 and the immediately following block 16 would be brought into the cache, assuming that block 16 is not already stored in the cache memory. The determination of the record position within its block would be a simple matter, i.e. the block number is determined by dividing the block length into the RBA, and the remainder would be the relative record position in the block.

Studies by the inventors have indicated that appropriate values for a desirable block length are in the range of 8 to 24 records. It is often the case that only part of the original sequence may be repeated, and this will occur more often in the case of relatively long sequences. If only a portion of the original sequence is repeated, it may be desirable to maintain the repeated portion in the cache memory while deleting the remainder of the sequence, and this would be impractical if the fixed blocked length were very long, e.g. 24 records. Accordingly, it is preferable to maintain more "granularity" by storing a long sequence as multiple, fixed length data blocks. Each individual data block is then subject to independent management as to how long it is retained in the cache waiting for a future request. Some blocks may be deleted if no future request is received, while other blocks brought into the cache at the same time will be maintained if a repeat request occurs in the near future. Thus, the inventors have chosen a fixed block length of eight records in the preferred embodiment of the present invention and the effective block length is varied by sometimes transferring multiple fixed blocks.

While it is possible to utilize only a single threshold to determine the possible transfer of a single additional data block as described above, the preferred embodiment of this invention will utilize a two-threshold technique wherein each threshold occurs at a different location within the previously described fixed length block. The two thresholds are designated $T_1$ and $T_2$, respectively, where $T_2$ is greater than or equal to $T_1$. Satisfying the threshold $T_1$ comparison results in a decision to read two sequentially located data blocks from the disks and store them in the cache memory, the first block containing the last record in the read miss request and the second block being the next block immediately following the original block containing the requested record. Satisfying the threshold $T_2$ comparison results in a decision to read three sequentially located data blocks from the disk and store them in the cache memory with the first of these sequentially located blocks containing the requested data record.

Figure 12A:
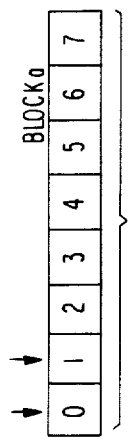
FIGS. 12a-12c are explanatory diagrams of the prestaging, or prefetch, operation according to the present invention.
Figure 12B:
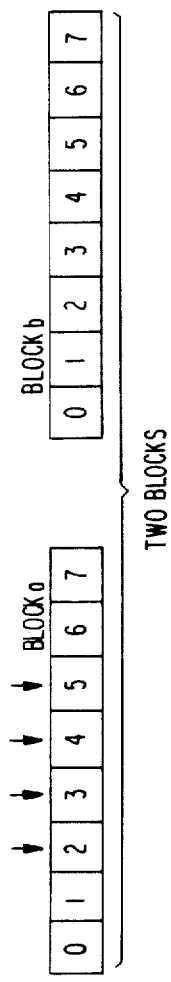
Figure 12C:
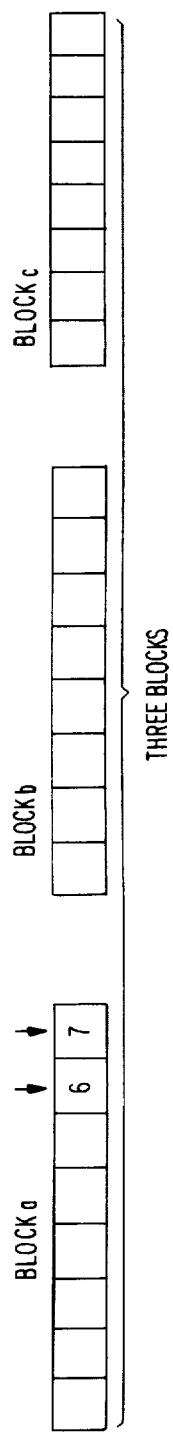

It should be noted that where a single read request involves multiple records, the prefetch operation will be performed only if the last requested record is a read miss, and the threshold comparison for the prefetch operation is only applied to the position of the last requested record in its respective data block. More particularly, referring to FIGS. 12a-12c, there are eight records in each block. If records 0 and 1 of block A are requested by the host processor as illustrated in FIG. 12a, the entire block containing the requested records will be transferred to the cache memory. If any one of records 2-5 in block A are requested as in FIG. 12b, not only block A but also the succeeding block B will be transferred to the cache memory. Finally, if either of records 6 or 7 in block A is requested as illustrated in FIG. 12c, blocks B and C in addition to block A will be transferred to the cache memory. This type of operation, herein referred to as "prefetch", is due to the relatively high probability that records from a succeeding block B of data will be requested in subsequent I/O operations when records from the latter three-fourths of block A have been requested, and that records from block C may also soon be requested when records in the last one-fourth of block A have been requested in the present I/O operation.

If R denotes the relative location of a particular record within a fixed block, the value of R will range between 0 and 7 when the block length is 8. For $R < T_1$, only the requested data block is transferred, for $T_1 \leq R < T_2$ the requested data block and the following block are transferred, and for $R \geq T_2$ the requested data block and the following two blocks are transferred. The average effective block length will be determined by the levels of $T_1$ and $T_2$. For instance, with $T_1 = T_2 = 8$, neither of the thresholds can ever be equalled and every transfer will involve a single block of 8 records, while for $T_1=T_2=0$ both thresholds will always be equalled and every transfer will involve three data blocks for 24 total records. With $T_1=2$ and $T_2=6$, one-fourth of the transfers will involve only 8 records, one-half of the transfers will involve 16 records and one-fourth of the transfers will involve 24 records, thereby resulting in an average effective block length of 16 records. The following table, given by way of example only, indicates representative values of $T_1$ and $T_2$ and the resulting average effective block lengths:

| Value of T1 | Value of T2 | Average Effective Block Length |
| --- | --- | --- |
| 8 | 8 | 8 |
| 6 | 8 | 10 |
| 4 | 8 | 12 |
| 2 | 8 | 14 |
| 2 | 6 | 16 |
| 2 | 4 | 18 |
| 0 | 4 | 20 |
| 0 | 2 | 22 |
| 0 | 0 | 24 |

Assuming an infinite cache memory capacity, it will be easily appreciated that longer average effective block lengths would result in improved performance advantages. The longer block lengths would result in transferring more data into the cache memory with a resulting higher probability of a future read hit. From a practical standpoint, however, longer average effective block lengths will improve the cache memory efficiency only up to a certain point after which increasing block length will decrease the performance advantages. This is due to the storage of excessive amounts of additional information of marginal recall probability, thus occupying memory capacity which could be better used for higher probability information. There will generally thus be some optimal average effective block length which can be achieved by proper setting of the thresholds $T_1$ and $T_2$. One set of threshold levels generally suitable is that described above wherein the position of the requested record in the last one-fourth of its data block will result in transferring a total of three blocks while the position of the requested record in the second and third quarters of its data block will result in transferring a total of two blocks. However, the desirability of utilizing larger average effective lengths will depend on the average length of a sequence of records requested by the host processor. If the average sequence length is very long, longer average effective block lengths will improve performance advantages.

Unfortunately, there is no way of knowing ahead of time which average effective block length will be optimal for a given customer and, in addition, the value of the optimal block length will change from task-to-task with any given customer. It may be desirable, therefore, to provide dynamic control of the threshold levels in order to optimize the performance. This could be done by continually evaluating a variety of aspects of the system performance and changing the threshold values accordingly, but in the preferred embodiment of this invention a much simpler technique is chosen whereby the threshold levels are continually varied in accordance with the read hit ratio which is one of the most important measures of the system efficiency. The read hit ratio is a measure of the percentage of read requests which result in a read hit.

One technique for dynamically adjusting the threshold values $T_1$ and $T_2$ will now be described. In a relatively straightforward manner, the microprocessor may include a counter for counting the number of disk accesses, a second counter for counting the number of disk read accesses and a third counter for counting the number of read hits. The microprocessor will then compute a read hit ratio by dividing the number of read hits by the number of read accesses. The calculation of the read hit ratio will only be performed when at least 1,000 disk accesses have occurred, at least 250 read accesses and at least 50 read hits have occurred. Once all of these minimums have been met, the read hit ratio is calculated and all three counters are reset to zero. The cycle continues until all three minimums are again met and a new read hit ratio is calculated.

The average effective block length can be varied in accordance with the calculated read hit ratio by varying the threshold levels $T_1$ and $T_2$. Thus, these two threshold parameters can be set at preselected initial values and a read hit ratio is calculated after the above-described minimums have occurred. It should be noted that the number of read hits is the only quantity influenced by the selection of thresholds $T_1$ and $T_2$.

After a first read hit ratio has been calculated, a new set of thresholds $T_1$ and $T_2$ are selected in such a manner as to make a single step increase in the average value of the effective length. A new read hit ratio is calculated and compared to the previous calculated value and, if the new read hit ratio is larger, the parameters $T_1$ and $T_2$ are again altered so as to achieve a further single step increase in the average effective block length.

This changing of the threshold values continues until the newly calculated read hit ratio is smaller than the previous calculated value, at which time the threshold values are changed back to the previous levels where the optimum read hit ratio occurred. If desirable, a confirmation cycle may be undertaken after changing the threshold values back to the previous values, with the confirmation cycle lasting for a period of twice the normal evaluation period to confirm that the latest threshold values do still result in the best read hit ratio.

The finally selected threshold parameters may be maintained for a period of time of 20 or more standard evaluation intervals at the end of which a new evaluation cycle is undertaken to again determine the optimal threshold settings corresponding to a maximum read hit ratio. In these subsequent evaluations, the threshold levels will be changed so as to either increase or decrease the average effective block length until the read hit ratio reduces. The average effective block length will then be changed in the opposite direction until the read hit ratio reduces, to ensure that the optimum threshold values have been found, and a confirmation cycle is then conducted at the best threshold levels to ensure that they are still preferable.

Returning now to FIG. 6b, if none of the blocks was a miss, there would be no disk-to-cache operation necessary, and the microprocessor would exit the cache algorithm at the bottom of FIG. 6b. Since a miss has occurred, however, the microprocessor prepares for the disk-to-cache operations by setting the starting RBA and by setting the cache status to "miss". Before beginning disk-to-cache transfer, the microprocessor performs a "prefetch" calculation to determine if any additional blocks of data should be transferred as will be explained in more detail with reference to FIGS. 12 and 13.

Figure 13:
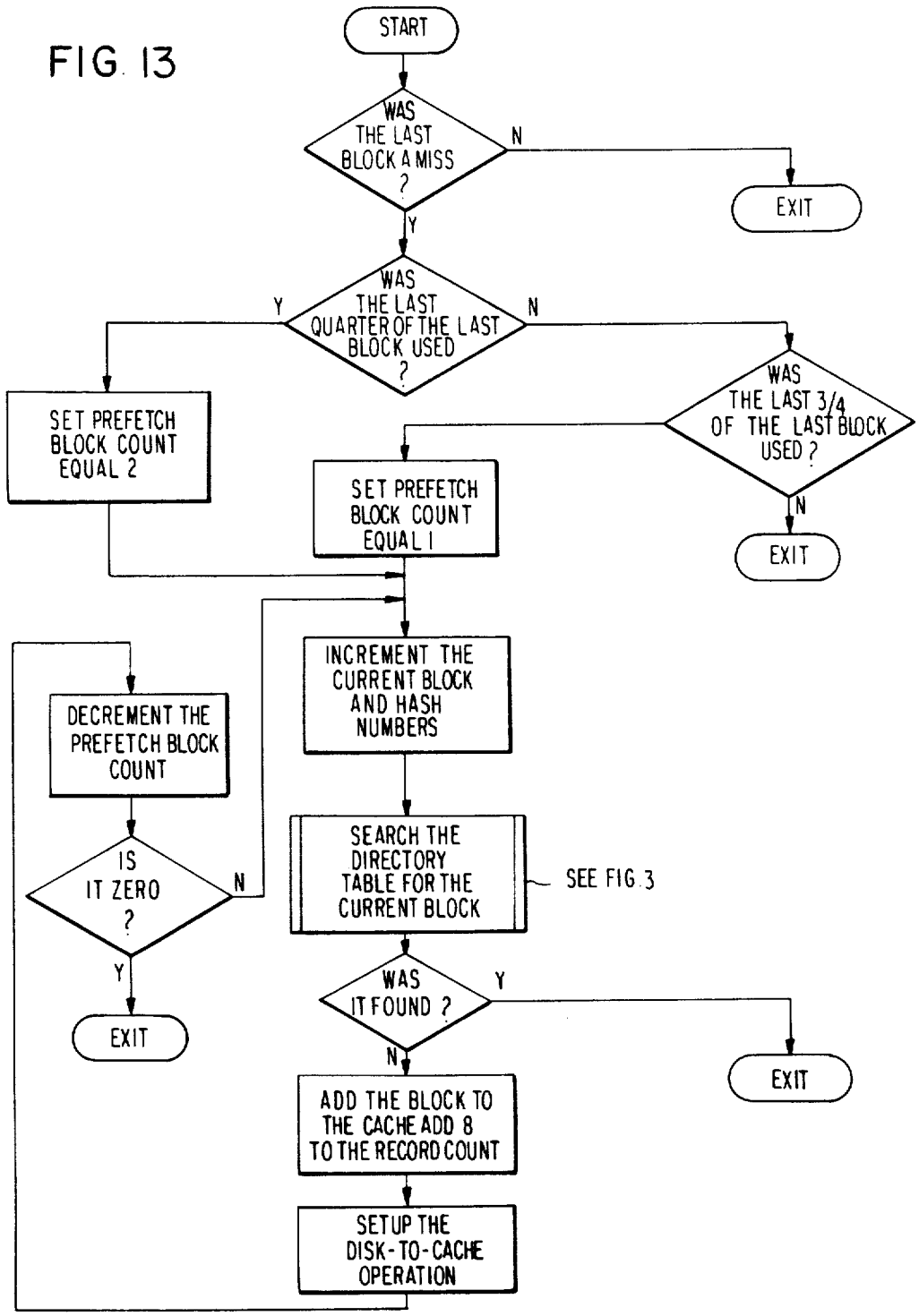
FIG. 13 is a flow chart illustrating in more detail the step in FIG. 6b of performing the prefetch calculation.

FIG. 13 is a flow chart of the prefetch calculation. In the preferred embodiment of this invention, the prefetch operation will only be performed if the last block of a series of requested blocks is not found in the cache memory. If the last block is a hit, the cache algorithm is ended, the controller operation proceeds as illustrated in FIG. 5 and only the missed data blocks are transferred. Assuming that the last requested block was a miss, the microprocessor determines if the last quarter (records 6 and 7) of the missed block was requested and, if so, a prefetch block count of 2 is set. If not, the microprocessor determines if the second or third quarters of the last block were requested. If not, no prefetching is warranted and the cache algorithm is ended, and if the second or third quarters of the last block were requested a prefetch block count of 1 is set. The microprocessor then increments the current block and hash entry numbers and performs a directory table search for block B in the manner set forth in FIG. 3. If block B is found to be already in cache, the cache algorithm is ended and controller operation proceeds as in FIG. 5. Even if the last quarter of block A is requested, there is insufficient advantage in transferring block C to cache if block B is already resident in cache.

If block B is not found in cache, a new page is added via the process of FIG. 7, and the record count is incremented by eight to indicate the transfer of an additional block. The prefetch block count is then decremented by 1 and, if there was only one prefetch block requested, the cache algorithm is ended and the requested blocks together with the additional block B are transferred to cache. If two prefetch blocks have been indicated, the current block and hash entry numbers are again incremented and a search for block C conducted. If block C is not found in cache, a further page is added to cache according to the process of FIG. 7, and the record count is again incremented by eight.

Returning again to FIG. 5, after the cache algorithm is completed for a read operation, the microprocessor checks to determine if the bypass factor has been exceeded. If the bypass factor has been exceeded, the microprocessor will have set a cache status indication at 78 in FIG. 6a and the cache algorithm will have been ended at that point. Subsequently, in the operation illustrated in FIG. 5, the microprocessor need only examine this cache status indication and, if the bypass factor has been exceeded, the operations required to transfer the data directly from disk-to-host processor are set up in a conventional manner. The file operation 79, is only necessary if data is to be transferred to or from the file, i.e., the attachment disk or disks. This is unnecessary in the case of a total hit. All data transfer operations are then executed and the controller operation is ended by setting the interrupt request.

If the bypass factor has not been exceeded, the microprocessor follows program path 81 in FIG. 5 and, if a "total hit" has occurred, i.e., all requested data blocks have been found in cache, the cache-to-host processor transfer operations set up in the cache algorithm are executed and the controller operation is ended. The changing of the newly requested data blocks to most-recently-used status in the LRU table will have already been accomplished in program path A in the cache algorithm of FIG. 6b.

If the bypass factor has not been exceeded and a miss has occurred, the file operation is issued, data transfer operations are executed and the controller operation is terminated.

The description thus far has concerned primarily a "read miss" situation in which at least one requested block of data has not been found in the cache memory. A read hit operation is significantly less complicated since the contents of the cache need not be updated. In the cache algorithm of FIGS. 6a and 6b, the path A will have been followed and the only memory management operation, i.e., the updating of the requested data blocks to most-recently-used status, will be performed at 82 in FIG. 6b. Assuming the bypass factor has not been exceeded and a total hit has occurred, the microprocessor will follow program path 83 in FIG. 5 and the operations will be executed to transfer the requested data from the cache to the host processor.

At some time the host processor may wish to write into a disk memory location to replace old data. In such a case, assuming that a cache is installed and a cache operation requested as indicated in FIG. 5, the cache algorithm of FIGS. 6a and 6b performed. The write through and write operation flags are set to indicate a write through operation, and the request is examined to see if the bypass factor has been exceeded. If so, the wrte-through flag is reset to indicate that the data is to be transferred directly from the system to the disk file without goind through the cache memory. The directory search is then performed in the same manner as described above in conjunction with a read operation. In the flow chart illustrated in FIG. 6a, step 84 is skipped for a non-write-through write operation since the host processor will not write into the cache. For write through wherein it is necessary to write into the cache memory, the cache will have to interface with the host processor main storage and step 84 should not be skipped.

Assuming the cache does not contain any data from a disk location into which the host processor wishes to write, and assuming the bypass factor has been exceeded and the write through flag reset, program paths 85, 75, and 86 are followed to the end of the cache algorithm in FIG. 6b. Referring again to FIG. 5, for a non-write-through write operation the microprocessor sets up the operations required to transfer data directly from the host processor to the disk, the data transfer operations are executed and the controller operation is terminated with an interrupt request.

If a write MISS occurs and the bypass factor has not been exceeded, write through is to be implemented and path D is followed in FIG. 6b. If the data to be written is less than a full block, operations are set up to transfer the data directly from the host processor to the disk file. If the data to be written is a full block, a page is added to cache in step 53, the system-to-cache transfer operations are then set up, followed by the cache-to-disk operations in path F in FIG. 6c.

If a "write hit" occurs, i.e., data from at least one of the disk memory locations to be written into is presently stored in the cache memory, program path 87 is followed in FIG. 6b if the bypass factor has been exceeded and any pages in the directory and LRU table corresponding to the disk memory location being written are deleted.

If the bypass factor has not been exceeded so that write through operation is still in effect, the LRU table is updated in step 82 of FIG. 6b and the cache-to-disk transfer operations are set up in path F of FIG. 6c.

If several blocks of data are to be written and the bypass factor not exceeded, the system-to-cache operations for all full block misses will be set up in FIG. 6b. For hit blocks, it is still necessary to write into the cache to update the data already stored there, and this is accomplished in path H of FIG. 6c for all except the last block. If the last data block to be written is a hit, the system-to-cache operations are set up in Path J of FIG. 6c.

After finishing the cache Algorithm for a write operation, the microprocessor continues according to the chart of FIG. 5. If the bypass factor has not been exceeded, all necessary data transfer operation will have been set up in the cache algorithm and need merely be executed. However, data cannot be transferred to the disk file from cache until the cache contents are updated. Accordingly, all system-to-cache operations are first executed, the file operation is then issued to prepare the disk file to receive the data, and finally the cache-to-disk and system-to-disk operations are executed.

If the bypass factor has been exceeded and the write-through flag reset, no system-to-disk operations will have been set up and this must be done in step 88 in FIG. 5, followed by the issuing of the file operation and the execution of all transfer operations.

FIGS. 14a–14f comprise a more detailed composite block diagram of the controller 20 shown in FIG. 1. The operation of the controller will be described with regard to a cycle steal device read operation, i.e., a request for data by the host processor which is to be implemented automatically by the controller.

A substantial portion of the operation of this controller is similar to the controller operations described in the above-referenced U.S. Pat. Nos. 4,038,642 and 4,246,637 and will not be described in great detail. Briefly, the host processor sends to the controller 20 an Immediate Device Control Block (IDCB) from main storage 11. The IDCB includes a first word containing an I/O command code and I/O device address which is sent out over the address bus 100. A second word identifying the data to be retrieved is simultaneously sent out over the channel data bus 23. The device address comparator 102 examines the address on bus 100 and, if it matches one of the address jumpers 104 corresponding to a device served by the I/O controller 20, a load pulse is sent to command register 106 to cause it to store the received address. This output signal is also provided as a load pulse to the Device Control Block (DCB) register 108 to cause the latter to store the data word from bus 23. A further output is provided on line 110 to one input of AND gate 112.

Shortly after placing the command and device address on bus 100, the host processor activates address gate line 114 so that, when the further output on line 110 is provided from the comparator 102, address gate return line 116 is activated to inform the host processor that an address match has been found. In response thereto, the host processor sends out a data strobe pulse on line 118.

During this initial selection sequence, the host processor checks the status of the controller 20 by examining the condition code present on the Condition Code In Bus 120, this condition information being provided from register 122. The contents of register 122 are controlled by the microprocessor to reflect the current status of the controller 20.

After completion of the foregoing steps, the host processor deactivates the address gate line 114 which, in turn, causes the AND circuit 112 to deactivate the address gate return line 116. This concludes the initial selection sequence. Shortly thereafter, the command in command register 106 and the data word in DCB register 108 are transferred to the microprocessor via the Data Bus In (DBI) bus. The microprocessor examines the command and, depending on the current status of the controller 20, decides what to do next.

First, the controller fetches the DCB words from the host processor by cycle stealing them one word at a time from the host processor. To accomplish this, the microprocessor loads the DCB address from register 108 into an address counter 150 from which it is subsequently transferred to a cycle steal address register 152. Since the DCB will typically contain eight words (16 bytes), the microprocessor sets a count of 16 into the byte counter 153.

A Cycle Steal Request signal is provided at the output of latch 155 in response to one of a predetermined number of combinations of input signals to AND gates 157, 158 and 159. This Cycle Steal Request signal is then provided as one input to AND gate 160 and, in the absence of a Cycle Steal Poll Capture signal from latch 162 or an output from polarity hold circuit 163, gate 160 will provide a Cycle Steal Request In signal to the host processor.

In response to the Cycle Steal Request In signal, the host processor sends out a Poll ID signal on bus 164 which sets AND gate 166. Assuming that a Cycle Steal Request signal is present, polarity hold circuit 168 will provide an output through OR gate 170 and polarity hold circuit 172 to the input of AND gate 174 which will send a Poll Return signal to the host processor. In response to the poll return signal, the host processor sends out a service gate signal on line 175 which results in a Cycle Steal Service Gate Capture signal at the output of polarity hold circuit 163. This signal is provided to the CD terminal of polarity hold circuit 176, so that a Service Gate Return signal is provided by OR gate 178 on line 179.

After receiving the Service Gate Return signal on line 179, the host processor accepts over address bus 100 the address from cycle steal address register 152, which is the address of the first Device Control Block (DCB) word. The host processor then fetches this word and places it on the channel data bus 23 which is loaded into the CSDR 30. At approximately this time, the microprocessor increments address counter 150 by a count of 2 decrements the byte counter 153 by a count of 2, since CSDR 30 is a one-word register, and the new address in counter 150 is transferred to the address register 152 in order to prepare the controller for the next Cycle Steal Request In signal. The DCB word in cycle steal data register 30 is then transferred to the microprocessor and stored therein, and a new Cycle Steal Request In signal is sent out by gate 160 to initiate the sequence for obtaining the next DCB word. This is continued until all of the DCB words are stored in the microprocessor, at which time the content of byte counter 153 is 0 and line 180 is activated.

After obtaining all of the DCB words, the microprocessor begins setting up the controller to implement the automatic transfer operations. Initially, automode latch 182 is set to indicate an automatic mode of transfer, and Cycle Steal Input Mode latch 184 is also set to indicate an input, or device read, operation. The outputs from each of these latches are used in various control logic operations within the controller, and the output from cycle steal input mode latch 184 is also provided, in the presence of a Cycle Steal Service Gate Capture signal, through AND gate 186 as a cycle input indicator on line 187. The microprocessor also enters into the byte counter 153 the number of bytes of data to be transferred, and enters into the address counter 150 the starting address in the host processor for the data being transferred to the host processor main storage.

Communications with the attachment devices are established by means of a request out sequence. The microprocessor loads the tag register 190 with appropriate control information and loads the attachment data register 32 with any data or other information which may be necessary. The microprocessor also sets latch 192 to provide an Attachment Data Register Full signal on line 193, latch 184 is reset to the "output mode" condition and Request Out Flip-Flop 195 is also set to provide a Request Out Signal.

In response to the request out signal, the device control unit 14 activates an Acknowledge Request Out line 196, and this signal is provided through OR gate 197 to one input of AND gate 198. Since all other inputs to gate 198 are on, Strobe Out flip-flop 200 will be set and a strobe out signal will be sent to the attachment device control unit. In response to this strobe out pulse, the device control unit loads information from tag register 190 and attachment data register 32 via tag bus 202 and attachment data bus 25, respectively. The strobe out signal also resets request out flip-flop 195.

The information supplied to the device control unit 14 enables the control unit 14 to perform the required data transfer operations with one of the attachment devices 16. Each time the device control unit 14 is ready to transfer data, it activates Request In line 204 in response to which AND gate 206 will provide an Acknowledge Request In signal when either of AND gates 207 or 208 provides an output. For an output transfer, AND gate 207 will provide an output when the attachment data register is full and an appropriate control signal is received on line 209. For an input transfer in which data is to be read from an attachment device, AND gate 208 will provide an output when the attachment data register is full and is ready for a data transfer and an appropriate control signal is received on line 210.

It should be noted that the component 211 and all similarly illustrated components are inverters signifying a NOT operation. Further, the control signals applied to lines 209 and 210, and similar control signals utilized elsewhere in the controller according to the present invention, can be more clearly understood with reference to FIGS. 15a and 15b. As shown in FIG. 15a, the controller according to the present invention includes three data registers 30, 32 and 44, and provisions are made for transferring data in either direction between any two of the three registers. Thus, there are in effect six data paths among the registers. The controller according to the present invention includes circuitry shown in FIG. 15b for providing control signals under the control of the microprocessor and dependent upon the type of transfer being made. Path registers 212 may, for example, provide a three bit output to path decoder 214 which, in turn, provides the appropriate control signals to the remaining portions of the I/O controller circuitry. Any logic inputs, for example inputs to AND gates 207 and 208, indicating alternative path control signals such as "path 4 or 6" could be coupled to the appropriate path decoder output signals via an OR gate.

Returning again to FIG. 14, for an input mode transfer, the device control unit responds to the acknowledge request in signal by providing a Strobe In signal on line 220 whereby the attachment data register 32 loads the data word appearing on the attachment data bus 25. This Strobe In signal is also provided to AND gates 222 and 224 whereby the register 192 is set to indicate that the attachment data register is full.

If the word in the attachment data register is not to be placed in cache, the controller according to the present invention will operate in a manner substantially similar to that described in U.S. Pat. No. 4,246,637. Briefly, a "path 1" signal provided to AND gate 226 will result in a load pulse being generated on line 227 to the CSDR register 30 whereby the register will store the data placed on bypass bus 31 by the attachment data register. This load pulse is also provided as one input to AND gate 159, the output of which sets flip-flop 229 to indicate that the cycle steal data register is full. The output of AND gate 159 also sets flip-flop 155 whereby a Cycle Steal Request In signal is again provided from AND gate 160 to the host processor. This Cycle Steal Request In signal initiates a signalling sequence by which the host processor takes in the data word from the cycle steal data register 30, the Cycle Steal Request In signal is turned off and the flip-flop 229 is reset to indicate that the cycle steal data register is now empty. The foregoing steps would be repeated for each word of data transferred from a device control unit 12 to the host processor with the byte counter 153 being decremented by a count of 2 for each transferred word and the address counter 73 being incremented by two. For a device read operation, when the value in counter 153 reaches 0, the microprocessor initiates an appropriate interrupt sequence.

For a device write operation, the attachment device may typically be designed to write in increments of records, whereas the number of bytes to be written from the host processor may be less than a record. If this occurs, the byte counter 153 will be decremented to zero but the device control unit 14 will still want more data to complete the write operation, and a further Request In signal will be received. If the value in counter 153 is zero and if the CSDR 30 and ADR 32 are both empty indicating there is no further data to be written and a further Request In signal is received from the device control unit 14, a "pad zero" signal will be provided to enable AND gate 152 to thereby set flip-flop 236 and allow the process to continue. The pad zero signal will also be provided to ADR 32 to cause it to fill with zero's which will then be written into the attachment disk until the end of a record is reached and no further request for additional data is received.

If the data received in attachment data register 32 from the attachment control device is first to be transferred into the cache memory, the operation is somewhat similar but is transferred instead to a different register, i.e., the cache data register 60. In this regard, a "path 2" signal will be provided by the path decoder of FIG. 15b. Thus, rather than supplying an enabling signal to gate 226 whereby a load signal would be provided to the cycle steal data register 30, the decoder provides an enabling signal to one input of AND gate 230 whereby the cache data register will load the data which has been sent out onto the bypass bus 31 from attachment data register 32. When implementing a disk-to-cache transfer, the microprocessor will set the Cache Active flip-flop 232. Since the attachment data register is presently indicating full and the cache data register is empty, a "path 2" signal will result in a load signal to the cache register 44 and will simultaneously cause AND gate 234 to set the load register flip-flop 236, thereby resetting flip-flop 192 via AND gate 238 and setting the cache memory register full flip-flop 240 via AND gate 242. The resetting of flip-flop 192 will reset flip-flop 206 via gate 208 thereby terminating the Acknowledge Request In signal and informing the device controller that the device register 32 is now ready to receive the next word.

Figure 16:
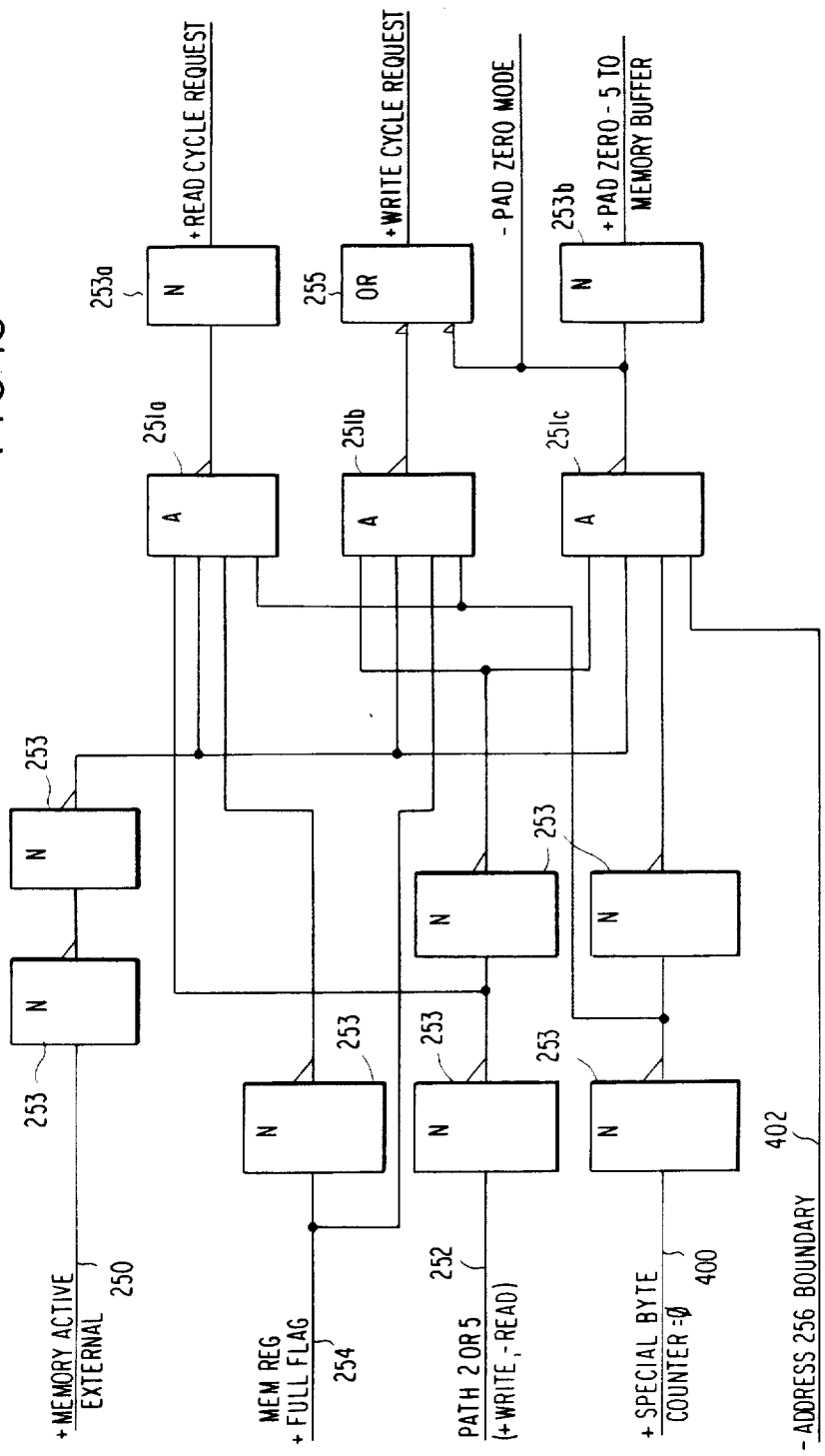
FIG. 16 is a more detailed logic diagram of a combination of request logic 256 and AND gate 290 in FIG. 14e.

FIG. 16 is a block diagram of combined logic circuitry for the request logic 256 and AND gate 290 to be described later. The logic circuitry includes inverting AND gates 251a–251c each of which will provide a low level output when all inputs are high and a high output at all other times, NOT gates such as 253a and 253b which will invert their inputs, and a negative OR gate 255 which will provide a high level output when either one of its inputs is low. With the first data word now stored in cache data register 60, and with all of lines 250, 252 and 254 active, request logic 256 will provide an output signal from gale 255 setting the write cycle latch 257, thereby enabling ring counter 258. Ring counter 258 may be a conventional three-stage, six-state or six-stage, twelve-state walking counter.

The microprocessor will have loaded into address counter 260 the starting address in the cache memory for the data being transferred, and will have loaded into the special byte counter 262 a value equal to the number of bytes being transferred in this operation. Since the available pages in cache may not always be consecutive, several operations may be required. For instance, if the entire transfer will involve ten records but the storage in cache is to begin at record 8 of an eight-record page, the transfer will be performed in three separate operations, the first transferring one record, the second transferring records 2–9 to a complete cache page, and the third transferring record 10 to a third cache page. Thus, in the first and third operations, the special byte counter 262 will be set to 256 bytes, and in the operation it will be set to 2048 bytes.

The decoder 264 will receive the outputs from ring counter 258 as well as a signal on line 259 indicating the type of cycle and will provide control signals as shown, first enabling the output of address row/column decoder 266, then providing a strobe signal on line 267 to laod the data on bus 268 into a cache memory location specified by the address buses 269 and 270, increasing the address counter 260, decreasing the special byte counter 262 and resetting the register 240 via a reset signal applied to AND gate 272. The decoder then sends an End of Cycle signal to the write latch 257 to reset the latch.

As soon as the word in attachment data register 32 was transferred to the cache data register 44, and while that word was subsequently being transferred to the cache memory as described above, a new word will have been entered into the attachment data register from the attachment device control unit 14. The attachment data register full flip-flop 192 will again be set, and with a "path 2" signal being provided, resetting of the flip-flop 240 at the end of the cache write cycle will enable AND gate 234 and set flip-flop 236, thus again loading the cache register 44 and setting flip-flop 240. This will cause the request logic signal on line 254 to go high and initiate a further write cycle. This will continue until all of the requested data has been transferred.

Figure 14A:
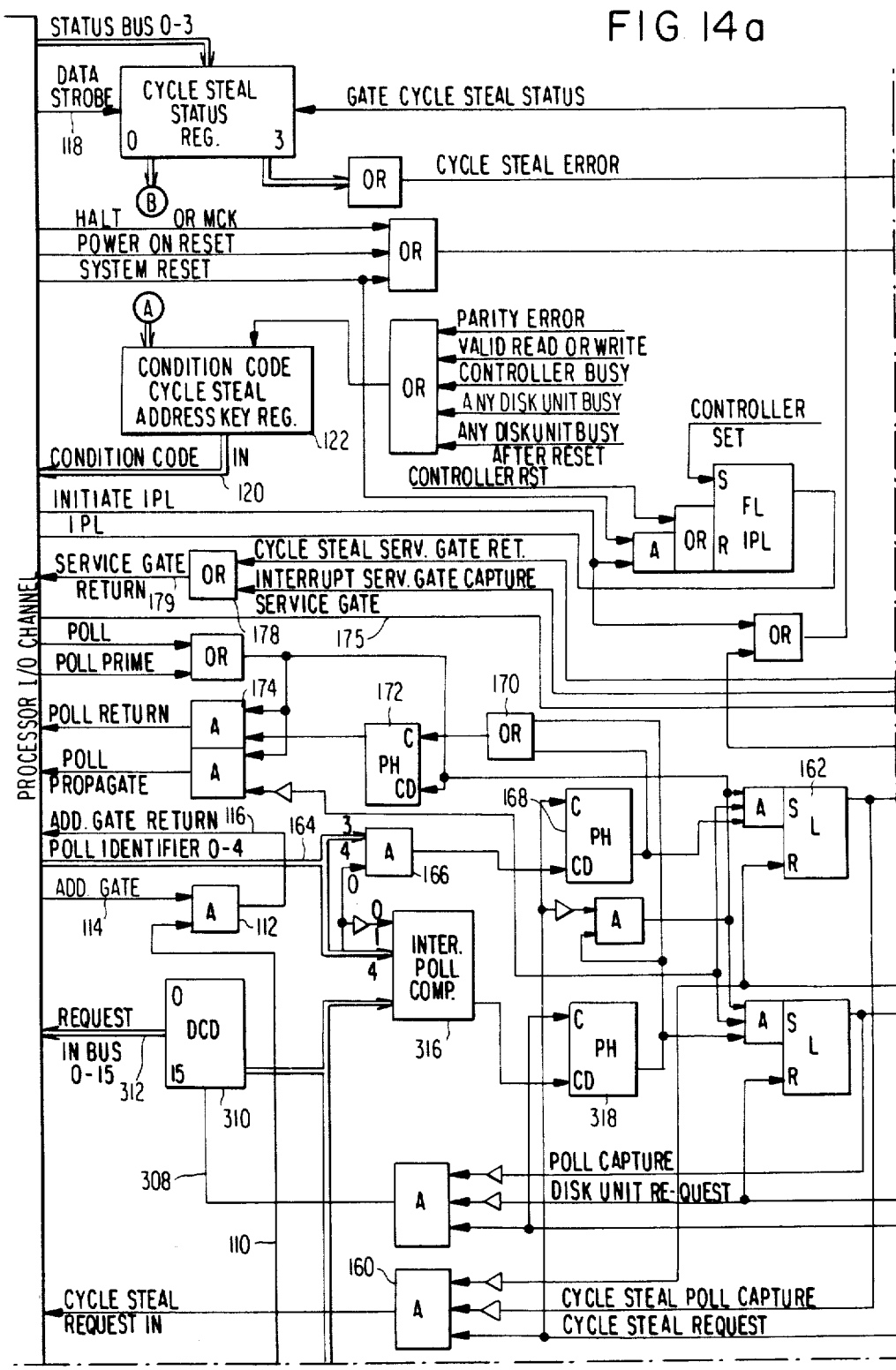
FIG. 14 comprised of FIGS. 14a-14e are a schematic block diagram of an I/O controller utilizing a cache memory according to the present invention.
Figure 14C:
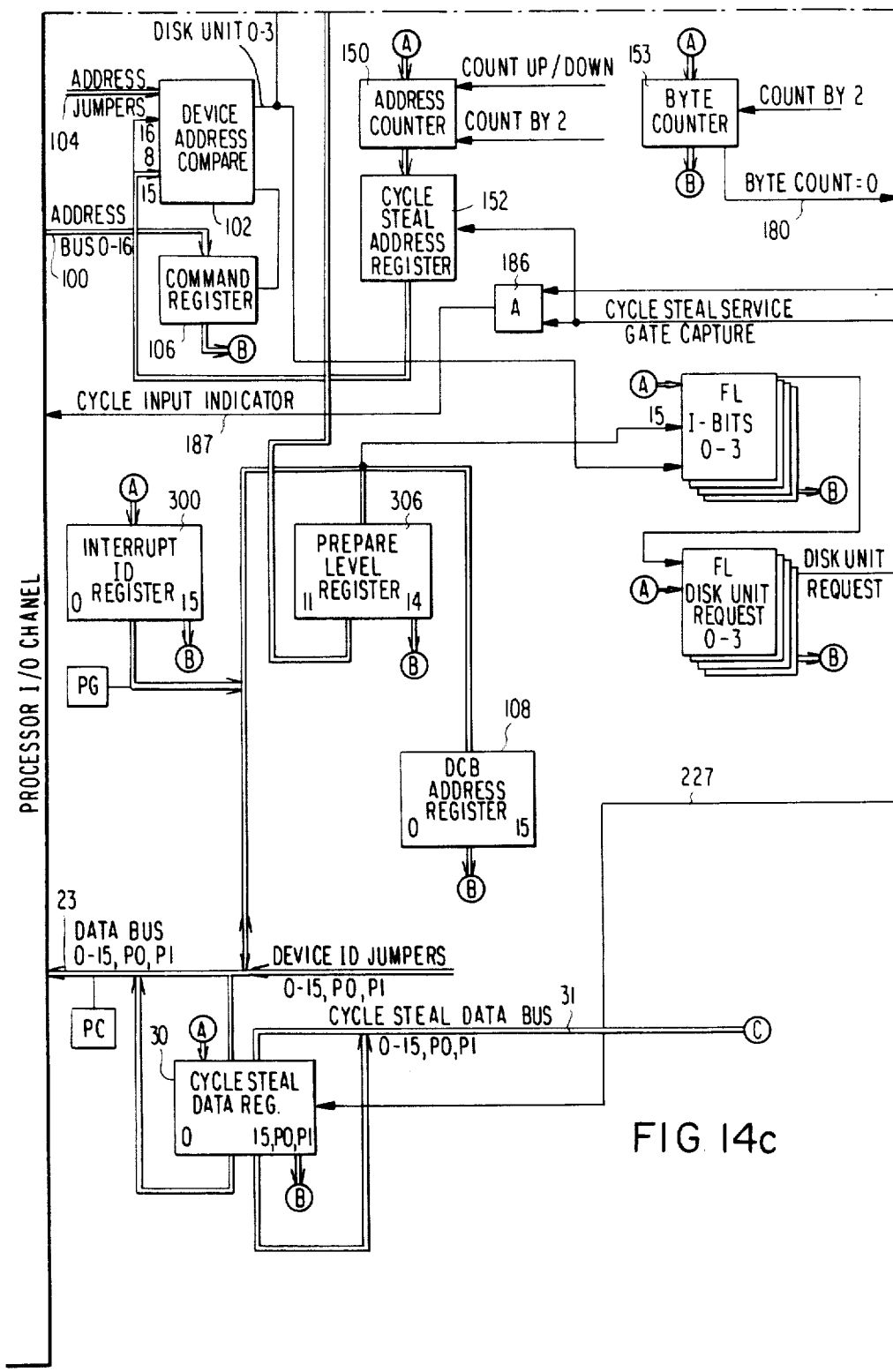
Figure 14D:
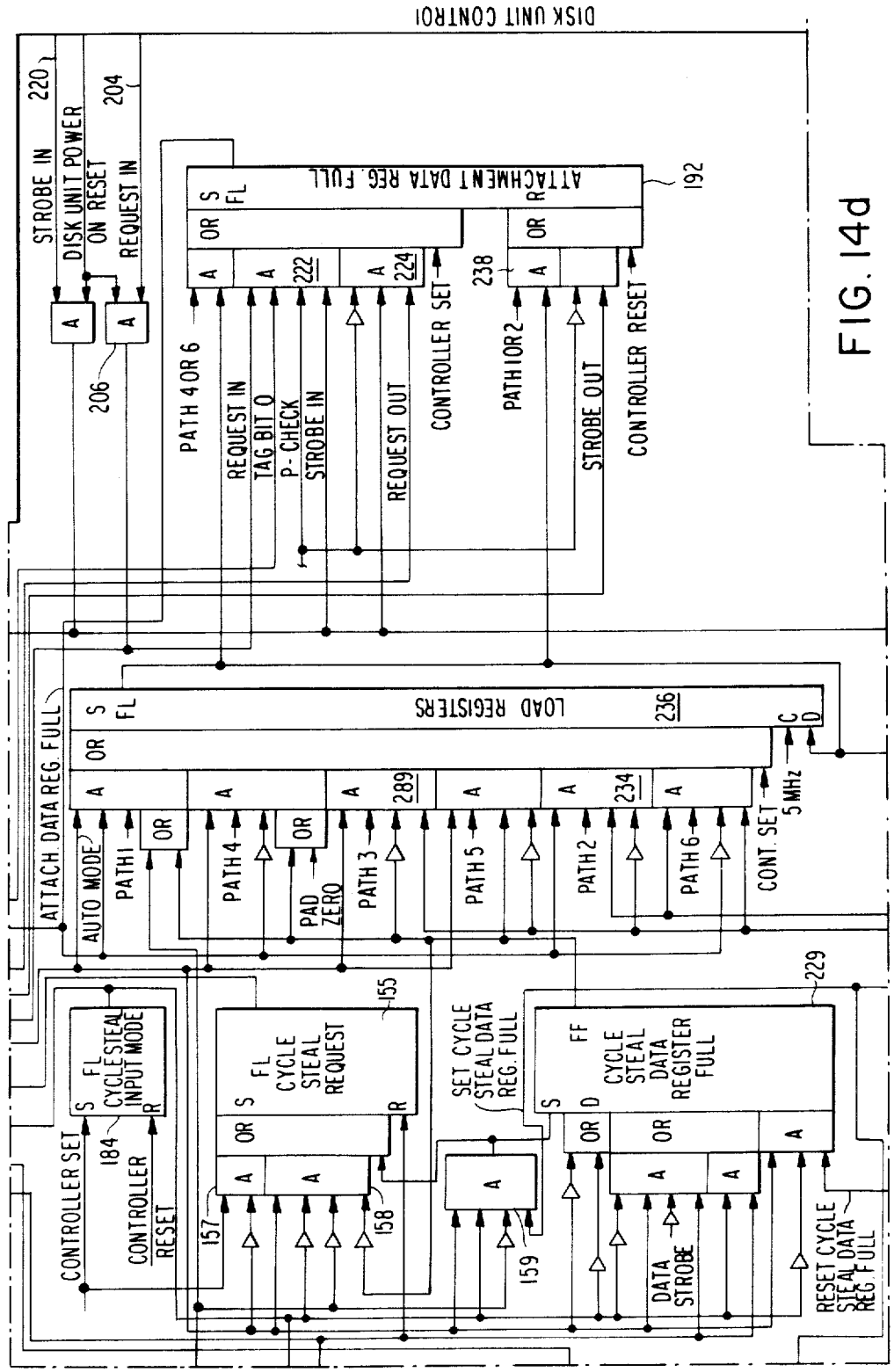
Figure 14E:
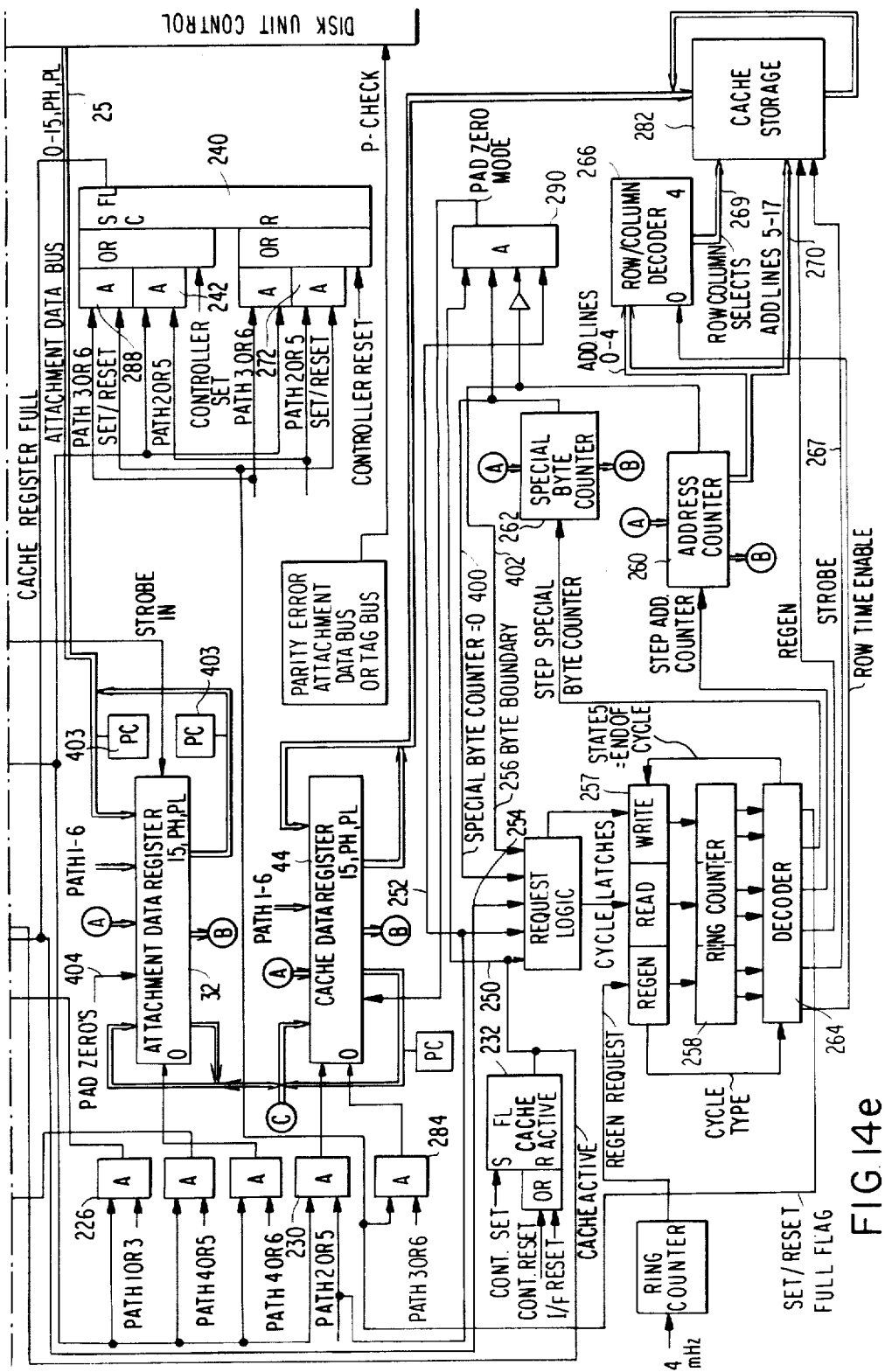

In implementing the cache memory in the data processing system, it is preferable that the cache memory operation by "transparent", i.e., that when data is transferred to the host processor from the cache memory, it will be precisely the same data as would have been transferred from the disk units. Accordingly, it is desirable to write into the cache memory in the same manner as writing into the disk units, and a pad zero mode of operation should be provided similar to that used in writing directly into the disk file. As shown in FIGS. 14e and 16, if the special bytes counter 262 reaches a value of zero but the end of a 256-byte record has not been reached, the signal levels on lines 400 and 402 will both be high. Under this condition, the outputs from inverting AND gates 251a and 251b will be high, but all inputs to inverting AND gate 251c will be high and its output will therefore be low. Thus, a write cycle request signal will be provided at the output of OR gate 255 and a low level pad zero mode signal will be provided to the cache register 44 to implement the pad zero mode of operation. The write cycle will thus continue writing zeros into the cache memory until a 256 byte boundary is reached indicating the end of a record, at which time the signal on line 402 will assume a low level and neither read nor write cycle request signals will be provided from the request logic.

In order to subsequently transfer the requested data from the cache memory to the cycle steal data register 30 from which it can be provided to the host processor in a conventional manner, the special byte counter 262 and address counter 260 will again be set to the number of bytes to be transferred and to the starting address in the cache storage of the data to be transferred, and a logic low signal will be provided on line 252 since only path 3 is being utilized. As the ring counter runs, decoder 264 will provide outputs similar and in the same order to those provided before, with the exception that the strobe write pulse will not be provided so that the cache memory 282 will provide the addressed contents on bus 268 to the cache data register 44. The final signal will be a set signal provided to AND gates 284 and 288 causing the register 44 to load the data from cache memory 282 and to set the flip-flop 240 to indicate that the register 44 is now full with CSDR register 30 empty, the output of flip-flop 2410 will set register 236 via AND gate 289 thus enabling gate 226 which will provide a load pulse to CSDR 30 to cause it to load the data from register 44. The host processor will then receive the contents of the cycle steal data register in a conventional manner.

This will be repeated until all data is transferred, at which time an interrupt sequence will be initiated.

More particularly, when the operation is completed, the microprocessor loads an interrupt ID word into ID register 300 and also loads an appropriate condition code, e.g., a "Device End" code, into the condition code register 122. During issuance of a prepare command from the host processor, an interrupt priority level signal is assigned to the controller 20 and stored in the prepare level register 306. When the microprocessor causes a signal to be generated on line 308, decoder 310 energizes an appropriate one of a plurality of lines on request bus 312.

The host processor responds to the signal on bus 312 by sending out a poll ID signal on bus 164, and this is compared in comparator 316 with the assigned I/O controller priority level stored in prepare level register 306. If a match is detected, an output is applied to CD terminal of bistable polarity hold circuit 318, and the circuit 318 provides an output through OR gate 170 to a further polarity hold circuit 172 the output of which is provided to one input of AND gate 174. Gate 174 will then send a Poll Return signal to the host processor and the host will respond by sending out a Service Gate signal on line 175. This is provided to polarity hold circuit 328 the output of which activates OR gate 178 to send a Service Gate Return signal back to the host processor on line 179. At the same time, the contents of register 300 are placed on the channel data bus 23 and the Service Gate Return signal tells the host processor that information is available on the bus 23 and also on bus 120. The host processor takes this information and stores it and deactivates line 175 to terminate the handshaking procedure. A more detailed description of this interrupt processing can be found in the above-referenced U.S. Pat. Nos. 4,246,637 and 4,038,642.

Although not described above, various logic components in FIG. 5, e.g., AND gate 222, are illustrated as having a "P-check" input. As is well known in the art, the data on the various buses will generally be provided with parity bits, and parity checks will be performed during various data transfers, e.g., at 403 in FIG. 14e. If a parity check fails, a retry is performed.

The above-described I/O controller utilizing a cache memory provides a significant improvement in the operating time of data processing systems utilizing a host processer and one or more attachment devices such as disk memories, since it reduces the number of times which the host processor must access the various disks. Further, the use of the directory table with all data blocks listed at a home position or contained in a conflict list beginning at a home position makes very easy the task of determining if a particular requested data block is currently stored in the cache memory, thus further improving efficiency. Finally, the "prestaging" by which subsequent data blocks are also transferred to the cache if a particular requested record occurs late in its data block will also improve the efficiency of the cache memory.

It should be appreciated that various changes and modifications could be made to the above-described system without departing from the spirit and scope of the invention as defined in the appended claims. As by one example, the cache memory itself need not be physically located with the I/O controller, but could instead be located with the device control unit 14 shown in FIG. 1.

What is claimed is:

1. In a method of operating a data processing system, said method being of the type wherein a host processor requests a record $R_m$ of data stored in at least one memory unit, said memory unit storing a plurality of data blocks each including a sequence of n data records occupying respective positions within said data blocks and consecutively designated $R_1$-$R_n$ including said requested data record $R_m$, where n and m are positive integers and $m \leq n$, and an I/O controller transfers said requested record from a cache memory to said host processor if said requested record is currently stored in said cache memory and to said cache memory from said memory unit if said requested record is not currently stored in said cache memory, the improvement characterized in that said transferring step comprises:

determining a first block of data in said memory unit containing said requested data record at a position m therein;

determining said position m of said requested data record in said first block of data; and transferring only said first block of data to said cache memory if $m < T_1$, where $T_1$ is a positive integer, $2 \leq T_1 \leq n$; and transferring both said first and said at least second data blocks to said cache memory if $m \leq T_1$.

2. The method according to claim 1, wherein said step of transferring data comprises, when said host processor requests a plurality of data records located in said memory unit in different data blocks, transferring said second data block to said cache memory only in accordance with the position of the last requested data record in its respective data block and only if the data block containing said last requested data record is not presently in said cache memory.

3. The method according to claim 2, wherein said transferring step comprises:

transferring only said first data block to said cache memory if said second data block is already stored in said cache memory.

4. A method of operating a data processing system, said system being of the type including a host processor, at least one memory unit for storing a plurality of data units each having a unique file system address and a corresponding hash entry number, a cache memory for storing a portion of the data stored in said memory unit and a controller for transferring data between said host processor and cache memory and between said memory unit and cache memory, said method being of the type wherein said host processor requests a unit of data stored in said memory unit and said controller transfers said requested data from said cache memory to said host processor if said requested data is currently stored in said cache memory, said method further comprising:

maintaining a directory table listing the data units currently stored in said cache memory, said directory table having a plurality of directory table positions each identified by a unique hash entry number and each having at least a file system address portion for indicating the file system address of the data unit listed at said directory table position and forward and backward pointers identifying other positions in said directory table;

examining said directory table to determine if said requested data unit is currently stored in said cache memory;

transferring said data unit from said memory unit to said cache memory if it is not currently stored in said cache memory;

listing said transferred data unit at its home position, i.e, the directory table position identified by the hash entry number corresponding to said transferred data unit, if said home position is not already occupied by a further data unit having the same hash entry number as said transferred data unit, whereby the listing of said transferred data unit comprises a home entry;

listing said transferred data unit at an unused directory table position having a different hash entry number if said home position of said transferred data unit is already occupied by a further data unit having the same hash entry number; and linking all directory table positions listing data units having the same hash entry number in a conflict chain via said forward and backward pointers.

5. The method of claim 4, wherein said examining step comprises examining the home position of said transferred data unit, and wherein said transferring step comprises transferring said requested data unit to said cache memory if the home position of said transferred data unit is not already occupied by a home entry or if said home position of said transferred data unit is occupied by a home entry but said transferred data unit is not included within said conflict chain.

6. The method according to claim 5, wherein, if said home position of said transferred data unit is currently occupied by data having a different hash entry number, said transferring step comprises:

transferring all information currently at said home position of said transferred data to an unused position of said directory table; and transferring said requested data unit from said memory unit to said cache memory and listing said transferred data unit at its home position in said directory table.

7. A data processing system comprising:

a host processor for requesting a record of data;

at least one memory unit for storing a plurality of blocks of data each including n data records occupying respective positions within said data blocks, where n is a positive integer, each block of data having a unique file system address and a corresponding hash entry number;

a cache memory for storing a portion of the data stored in said memory unit, said cache memory storing a plurality of data blocks at least a first plurality of which have the same corresponding hash entry number and different file system addresses and a second plurality of data blocks all having hash entry numbers different from one another;

a controller for transferring data between said host processor and cache memory and between said memory unit and cache memory, said controller transferring at least a first block of data containing the requested record to said cache memory from said memory unit if said requested record is not already stored in said cache memory; and directory table means for listing the blocks of data currently stored in said cache memory, said directory table means having a plurality of directory table positions each identified by a unique hash entry number and each having at least a file system address portion for indicating the file system address of the data block listed at said position;

each of said second plurality of data blocks being listed at their home positions in said directory table means, i.e., at the positions identified by their hash entry numbers, the listing of each of said second plurality of data blocks at its home position comprising a home entry;

one of said first plurality of data blocks being listed at a home position identifed by said same corresponding hash entry number and comprising a home entry and the remainder of said first plurality of data blocks being listed at directory table positions which are not home positions for any data block currently stored in said cache memory and thereby comprising conflict entries;

whereby said requested data block is not currently stored in said cache memory if there is no home entry at the home position of said requested data block in said directory table.

8. A data processing system as defined in claim 7, wherein each directory table position includes forward pointer and backward pointer portions pointing to other positions of said directory table, and each of the directory table positions corresponding to said first plurality of data blocks are linked together in a conflict chain via their forward and backward pointers, with said conflict chain beginning at the home position of said one of said first plurality of data blocks, whereby said requested data block is not currently stored in said cache memory if there is currently a home entry at the home position of said requested data block but if said requested data block is not included in a conflict chain beginning at said home position.

9. A data processing system as defined in claim 8, wherein each directory table position includes at least a further portion for indicating if said position is currently occupied by a home entry or if said position is currently occupied by a conflict entry.

10. A data processing system as defined in claim 9, wherein said system further comprises priority table means for listing said directory table entries in a priority order.

11. A data processing system comprising:

a host processor for requesting a record of data;

at least one memory unit for storing a plurality of blocks of data each including a sequence of n data records occupying respective positions in said data blocks and consecutively designated $R_1$-$R_n$ including said requested data record $R_m$, where n and m are positive integers and $m \leq n$, each block of data having a unique file system address and a corresponding hash entry number;

a cache memory for storing a portion of the data stored in said memory unit, said cache memory storing a plurality of data blocks at least a first plurality of which have the same corresponding hash entry number and different file system addresses and a second plurality of data blocks all having hash entry numbers different from one another;

a controller for transferring data between said host processor and cache memory and between said memory unit and cache memory, said controller transferring a first block of data containing the requested data and a second block of data to said cache memory from said memory unit if said requested data is not already stored in said cache memory, said controller transferring to said cache memory only a first block of data including said requested data record if $m < T_1$, where $T_1$ is a positive integer, $1 \leq T_1 < n$ and transferring both said first block of data and a second block of data of said cache memory if $m \geq T_1$.

12. A data processing system as defined in claim 7, wherein each block of data stored in said memory unit comprises a sequence of n data records consecutively designated $R_1$-$R_n$ including said requested data record $R_m$, where n and m are positive integers and $m \leq n$, said controller transferring to said cache memory only a first block of data including said requested data record if $m < T_1$, where $T_1$ is a positive integer, $1 \leq T_1 < n$ and transferring both said first block of data and a second block of data to said cache memory if $m \geq T_1$.

13. A data processing system as defined in claim 12, said controller comprising means for transferring, when said host processor requests a plurality of data records located in said memory unit in different first data blocks, the first data blocks including those requested records which are not already stored in said cache memory and transferring said second data block to said cache memory only in accordance with the position of the last requested data record in its data block and only if the data block containing said last requested record is not presently stored in said cache memory.

14. A data processing system as defined in claim 12, wherein said controller comprises means for transferring only said first data block to said cache memory if said second data block is already in said cache memory.

15. A data processing system as defined in claim 7 or 11, further comprising priority table means for listing the blocks of data stored in said cache memory in a priority order.

16. A data processing system as defined in claim 15, wherein said priority means comprises a Least Recently Used (LRU) table for listing the blocks of data stored in said cache memory in order of their most recent use, with the most recently requested data block in said cache memory being assigned the highest priority and the least recently used data block in said cache memory being assigned a lowest priority.

17. A data processing system as defined in claim 7 or 11, further comprising:
means for determining the number of consecutive memory unit data blocks requested at one time by said host processor and for preventing the transfer of data from said at least one memory unit to said cache memory if said number of consecutive data blocks exceeds a predetermined value.

18. A data processing system as defined in claim 7, wherein said host processor also requests that data be written into said at least one memory unit and wherein said controller means erases from said cache memory any of said data to be written which is currently stored in said cache memory.

19. A data processing system as defined in claim 8, wherein all unused directory table positions are linked together in a free chain via said forward and backward pointers with one of said unused directory table positions being designated as a first free entry.

20. The method according to any one of claims 4-6, further comprising the steps of linking said unused directory, table positions in a free chain via said forward and backward pointers and designating one of said unused directory table positions as a first free entry, and wherein said step of listing said transferred data unit at an unused directory table position having a different hash entry number comprises listing said transferred data unit at said first free entry.

21. A data processing system as defined in claim 11, said controller comprising means for transferring, when said host processor requests a plurality of data records located in said memory unit in different first data blocks, the first data blocks including those requested records which are not already stored in said cache memory and transferring said second data block to said cache memory only in accordance with the position of the last requested data record in its data block and only if the data block containing said last requested record is not presently stored in said cache memory.

22. A data processing system as defined in claim 21, wherein said controller comprises means for transferring only said first data block to said cache memory if said second data block is already in said cache memory.

* * * * *